US012225985B2

(12) United States Patent
Ono et al.

(10) Patent No.: US 12,225,985 B2
(45) Date of Patent: Feb. 18, 2025

(54) MALE MOLD HOOK-AND-LOOP FASTENER-EQUIPPED SHEET HAVING EXCELLENT QUIETNESS AND METHOD FOR MANUFACTURING SAME

(71) Applicant: KURARAY FASTENING CO., LTD., Osaka (JP)

(72) Inventors: Satoru Ono, Okayama (JP); Yoshikatsu Fujisawa, Sakai (JP)

(73) Assignee: KURARAY FASTENING CO., LTD., Osaka (JP)

( * ) Notice: Subject to any disclaimer, the term of this patent is extended or adjusted under 35 U.S.C. 154(b) by 370 days.

(21) Appl. No.: 17/760,063

(22) PCT Filed: Feb. 5, 2021

(86) PCT No.: PCT/JP2021/004460
§ 371 (c)(1),
(2) Date: Aug. 3, 2022

(87) PCT Pub. No.: WO2021/157734
PCT Pub. Date: Aug. 12, 2021

(65) Prior Publication Data
US 2022/0400818 A1    Dec. 22, 2022

(30) Foreign Application Priority Data
Feb. 7, 2020    (JP) .................................. 2020-019348

(51) Int. Cl.
*A44B 18/00*    (2006.01)
*B32B 3/06*    (2006.01)
(Continued)

(52) U.S. Cl.
CPC ............ *A44B 18/0015* (2013.01); *B32B 3/06* (2013.01); *B32B 3/30* (2013.01); *B32B 27/08* (2013.01);
(Continued)

(58) Field of Classification Search
CPC ... A44B 18/0015; A44B 18/0061; B32B 3/06; B32B 3/30; B32B 27/08; B32B 27/32;
(Continued)

(56) References Cited

U.S. PATENT DOCUMENTS 4,198,734 A * 4/1980 Brumlik ............. A44B 18/0015
24/449
5,985,406 A * 11/1999 Takizawa ........... A44B 18/0061
24/444
(Continued)

FOREIGN PATENT DOCUMENTS

EP    1265507    1/2008
JP    H04-91105 U    8/1992
(Continued)

OTHER PUBLICATIONS

International Search Report dated Apr. 27, 2021, in PCT/JP2021/004460, with English translation, 7 pages.
(Continued)

*Primary Examiner* — David M Upchurch
(74) *Attorney, Agent, or Firm* — Grüneberg and Myers PLLC

(57) ABSTRACT

A male-type molded hook-and-loop fastener-equipped sheet includes a male-type molded hook-and-loop fastener and a non-foam resin sheet integrated on the back surface of the male-type molded hook-and-loop fastener. The male-type molded hook-and-loop fastener includes a resin-made base plate and a plurality of male-type engaging elements made of the same resin, rising from the surface of the base plate and arranged in a row. The male-type engaging elements are bent in the direction of the row direction of the male-type engaging elements from the middle thereof, where the tip end portion approaches the base plate. The non-foam resin sheet is directly laminated and integrated on the back surface of the male-type molded hook-and-loop fastener. The resin
(Continued)

constituting the non-foam resin sheet is a resin mainly composed of an elastomer resin of the same type as the resin constituting the male-type molded hook-and-loop fastener, though with a lower hardness.

13 Claims, 2 Drawing Sheets

(51) Int. Cl.
    *B32B 3/30*       (2006.01)
    *B32B 27/08*     (2006.01)
    *B32B 27/32*     (2006.01)
    *B32B 27/34*     (2006.01)
    *B32B 27/36*     (2006.01)

(52) U.S. Cl.
    CPC .............. *B32B 27/32* (2013.01); *B32B 27/34* (2013.01); *B32B 27/36* (2013.01); *B32B 2250/24* (2013.01); *B32B 2307/536* (2013.01); *B32B 2307/732* (2013.01)

(58) Field of Classification Search
    CPC ..... B32B 27/34; B32B 27/36; B32B 2250/24; B32B 2307/536; B32B 2307/732
    See application file for complete search history.

(56) References Cited

U.S. PATENT DOCUMENTS

| | | | |
|---|---|---|---|
| 6,996,880 B2 * | 2/2006 | Kurtz, Jr | A44B 18/0061 24/449 |
| 7,404,241 B2 | 7/2008 | Murayama et al. | |
| 7,445,741 B2 * | 11/2008 | Poulakis | A44B 18/0049 264/211.13 |
| 11,425,971 B2 * | 8/2022 | Ono | A44B 18/0049 |
| 2005/0060849 A1 * | 3/2005 | Vanbenschoten | A61F 13/625 24/451 |
| 2005/0235462 A1 * | 10/2005 | Takahashi | A41F 1/00 24/306 |
| 2018/0050484 A1 | 2/2018 | Rocha | |
| 2019/0193310 A1 * | 6/2019 | Kopanski | A44B 18/0049 |

FOREIGN PATENT DOCUMENTS

| | | |
|---|---|---|
| JP | H06-154016 | 6/1994 |
| JP | H09-313218 | 12/1997 |
| JP | 2003-289910 | 10/2003 |
| JP | 2004-360815 | 12/2004 |
| JP | 2005-40231 | 2/2005 |
| JP | 2007-7124 | 1/2007 |
| JP | 4354232 | 10/2009 |
| JP | 2017-106277 | 6/2017 |
| JP | 2018-509985 | 4/2018 |
| JP | 2019-180631 | 10/2019 |

OTHER PUBLICATIONS

Written Opinion dated Apr. 27, 2021, in PCT/JP2021/004460, with English translation, 6 pages.

Extended European Search Report dated Jan. 31, 2024, in European Application No. 21751466.0, 8 pages.

* cited by examiner

[Fig. 1]
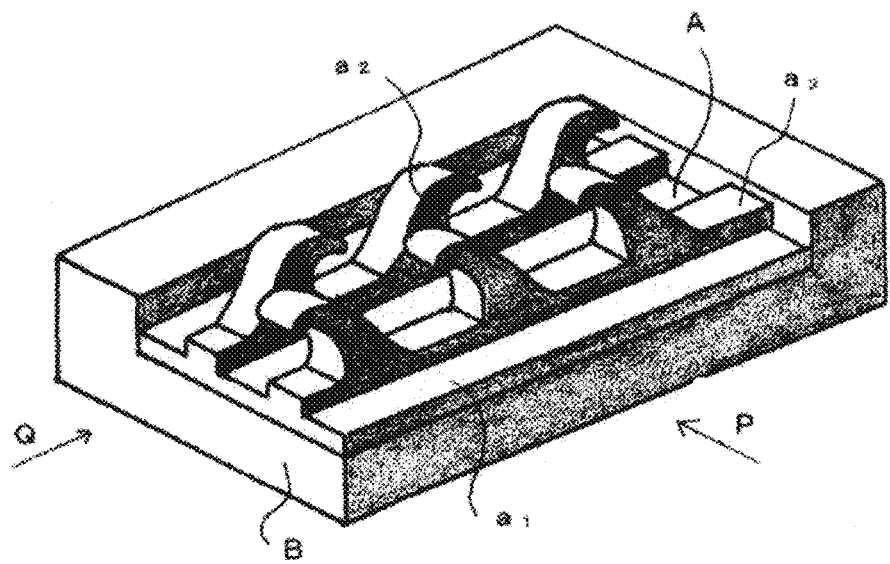
[Fig. 2]
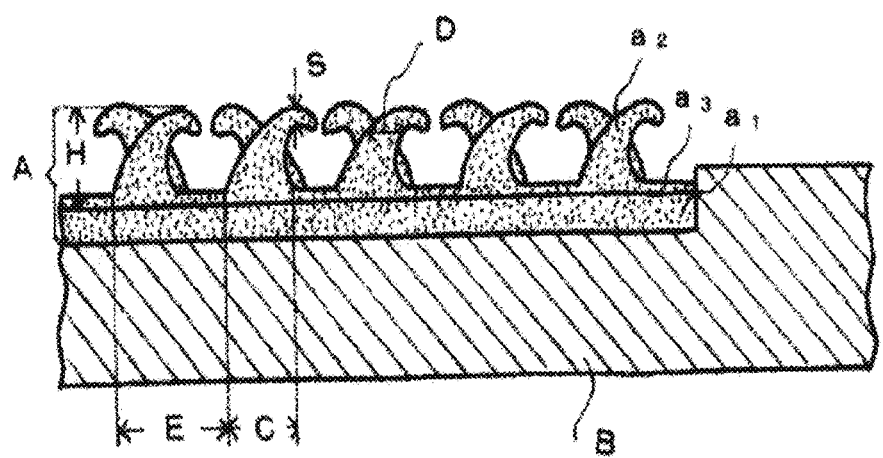

[Fig. 3]
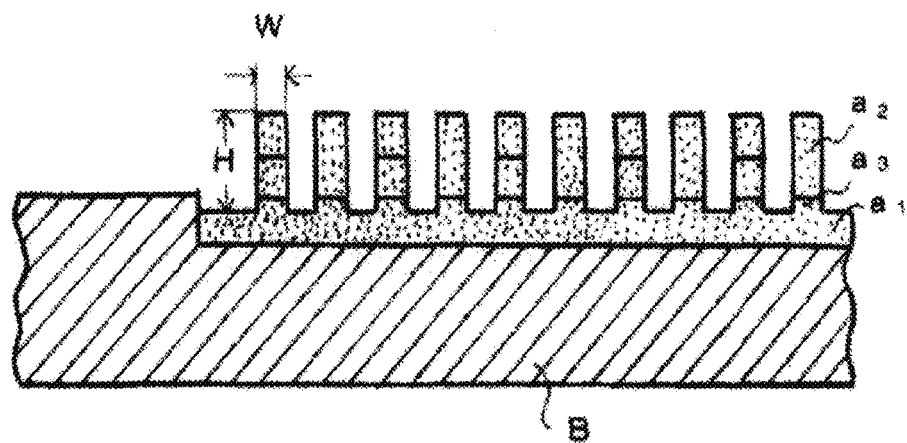
[Fig. 4]
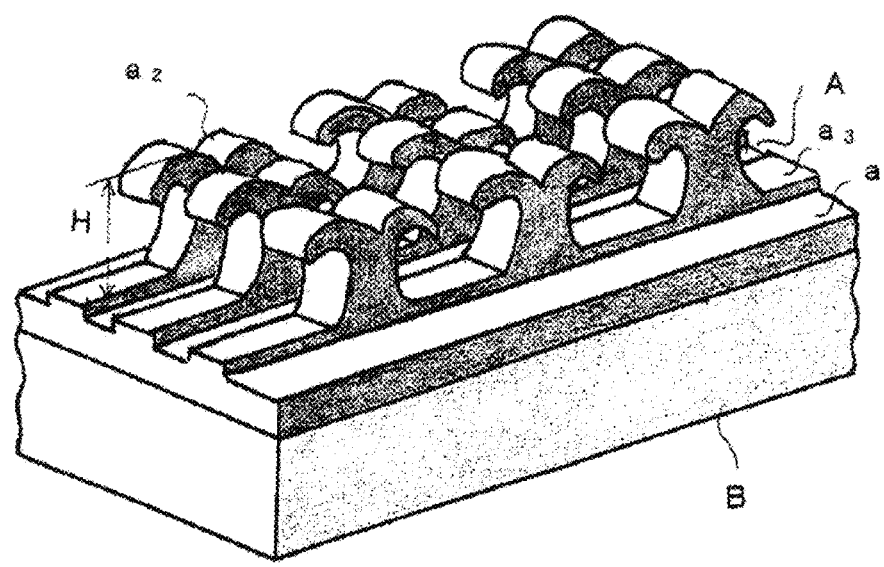

MALE MOLD HOOK-AND-LOOP FASTENER-EQUIPPED SHEET HAVING EXCELLENT QUIETNESS AND METHOD FOR MANUFACTURING SAME

CROSS-REFERENCE TO RELATED APPLICATIONS

This application is the National Stage entry under § 371 of International Application No. PCT/JP2021/004460, filed on Feb. 5, 2021, and which claims the benefit of priority to Japanese Application No. 2020-019348, filed on Feb. 7, 2020. The content of each of these applications is hereby incorporated by reference in its entirety.

BACKGROUND OF THE INVENTION

Technical Field

The present invention relates to a male-type molded hook-and-loop fastener-equipped sheet, and a method for producing the male-type molded hook-and-loop fastener-equipped sheet, which has low peeling sound and excellent quietness when peeling off engagement with a hook-and-loop fastener having a loop-shaped engaging element.

Background Art

Conventionally, as one of means for attaching an object to the surface of a material body, a method has been used in which a male-type hook-and-loop fastener having a hook type or mushroom type male-type engaging element is attached to either the surface of the material body or the object, a female-type hook-and-loop fastener having a loop-shaped engaging element is attached to the other surface, and both engaging elements are engaged by superposing the engaging element surfaces of both hook-and-loop fasteners, thereby fixing the object to the surface of the material body.

An advantage of such a hook-and-loop fastener is that the engagement and peeling can be repeated many times, and a high engaging force is maintained even if the engagement and peeling are repeated. On the other hand, a disadvantage of the hook-and-loop fastener is that the hook-and-loop fastener generates a large peeling sound such as a ripping sound, and is not suitable for an application in which engagement and peeling of the hook-and-loop fastener need to be performed in an environment where quietness is required.

For example, when a hook-and-loop fastener is used for an article for an infant, sleep of the infant may be disturbed by a sound generated at the time of peeling, and when the hook-and-loop fastener is used for equipment, clothes, shoes, helmets, or the like used in the military, the sound generated at the time of peeling may be found by an enemy. In addition, when a hook-and-loop fastener of an article with the hook-and-loop fastener is peeled off in a place where quietness is required for observation of wild birds, appreciation of music, or the like, the peeling sound generated at that time may cause wild birds and the like to escape or cause annoyance to an audience who deeply listens to music. Further, in the case where a hook-and-loop fastener is used in a golf glove, the sound generated when the hook-and-loop fastener is peeled off may interfere with the mental concentration of other players. Moreover, the ripping sound generated when the hook-and-loop fastener is peeled off cannot be said to be a high-grade sound at all, and even if the hook-and-loop fastener is used for any application, it is preferable that the sound generated when the hook-and-loop fastener is peeled off is as small as possible, and therefore, a hook-and-loop fastener having a small peeling sound is required.

It is said that a large peeling sound generated when a hook-and-loop fastener is peeled is mainly caused by a male-type hook-and-loop fastener, and a so-called quietness male-type hook-and-loop fastener having a small peeling sound is desired from the above-described requirements, and several proposals have been made so far to satisfy the desire.

For example, PTL 1 describes that a vibration-damping material-attached male-type hook-and-loop fastener in which a vibration-damping material layer made of natural rubber or synthetic rubber is attached to the back surface of a fiber-made hook-and-loop fastener having a large number of male-type engaging elements made of monofilaments having a fineness of 100 to 500 dtex on the surface of a woven or knitted base fabric by an adhesive has excellent quietness.

Further, PTL 2 discloses a male-type hook-and-loop fastener or a female-type hook-and-loop fastener of a fabric system in which peeling sound is reduced by laminating a pressure-sensitive adhesive layer on the back surface of a fabric-based hook-and-loop fastener provided with a large number of hook-shaped engaging elements made of monofilaments having a yarn diameter of 0.1 to 0.3 mm or a large number of loop-shaped engaging elements made of 100 to 400 dtex multifilament yarns made of 5 to 50 filaments on the surface of a fabric base cloth.

However, in the case of the technique of PTL 1, the effect of reducing the peeling sound is not necessarily high in the first place, and when the engagement and peeling are repeated, peeling is liable to occur in the adhesive layer, and accordingly, the effect of reducing the peeling sound of the male-type engaging element made of a monofilament is liable to be lowered, and it is difficult to transmit the peeling sound vibration of all the male-type engaging elements from the root thereof to the vibration-damping material layer and to attenuate the vibration by the vibration-damping material layer. Further, in the case of the male-type engaging element made of a monofilament, since the engaging element is made of a stretched thick long monofilament, it tends to continue to vibrate greatly at the time of peeling, and the peeling sound naturally increases. Moreover, even if the peeling sound such as a ripping sound generated by the male-type engaging element made of a monofilament is somewhat reduced, there is no change in the fact that it is still a ripping sound noise without quality.

In the technique of PTL 1, when a cross-linking type adhesive is used as the adhesive, it is possible to reduce peeling in the adhesive layer due to repetition of engagement and peeling. However, in this case, the male-type hook-and-loop fastener becomes hard, and cannot be used in applications such as clothes and gloves requiring flexibility.

Further, also in the case of the technique of PTL 2, similarly to the case of the technique of PTL 1, the effect of reducing the peeling sound is not high, a pressure-sensitive adhesive layer is easily peeled by repeating engagement and peeling, it is difficult to reliably transmit the peeling sound vibration of all male-type engaging elements from their roots to the pressure-sensitive adhesive layer, and further, since the male-type engaging elements are thick stretched long monofilaments, they tend to continue to largely vibrate at the time of peeling. Moreover, in the case of using a pressure-sensitive adhesive layer, when the amount of the pressure-sensitive adhesive to be attached to the back surface is increased in order to enhance the reduction of the peeling sound, dust is likely to adhere to the pressure-sensitive adhesive, and thus the technique of PTL 2 cannot be said to be a preferable technique from the viewpoint of appearance. Further, similarly to the technique of PTL 1 described above, even if the peeling sound such as a ripping sound generated by the male-type engaging element made of a monofilament is somewhat reduced, there is no change in the fact that it is still a ripping sound noise without quality.

CITATION LIST

Patent Literature

PTL 1: JP 4354232 B
PTL 2: JP 2007-7124 A

SUMMARY OF INVENTION

Technical Problem

An object of the present invention is to provide a quietness male-type molded hook-and-loop fastener-equipped sheet, which has a very quiet peeling sound when an engagement is peeled, which hardly reduces the effect of reducing the peeling sound even when engagement and peeling are repeated as in the conventional technique described above, which does not have the problem of a large peeling sound due to the ease of vibration associated with the male-type engaging elements being thick and long stretched monofilaments, which can reliably transmit the peeling sound vibration of the roots of all male-type engaging elements to the sheet on the back surface, which can make the peeling sound a calm peeling sound different from a noise such as a ripping sound, and which does not cause the problem of adhesion of dust due to a pressure-sensitive adhesive.

Solution to Problem

That is, the present invention provides a male-type molded hook-and-loop fastener-equipped sheet, including a male-type molded hook-and-loop fastener (A) and a non-foam resin sheet (B) integrated on the back surface of the male-type molded hook-and-loop fastener (A), wherein the male-type molded hook-and-loop fastener-equipped sheet satisfies the following conditions (1) to (4):
  (1) the male-type molded hook-and-loop fastener (A) includes a resin-made base plate ($a_1$) and a plurality of male-type engaging elements ($a_2$) rising from the surface of the base plate ($a_1$) and arranged in a row on the base plate ($a_1$);
  (2) the male-type engaging elements ($a_2$) are bent in the same direction as the row direction of the male-type engaging elements from the middle thereof, the tip end portion thereof approaches the base plate ($a_1$), and the male-type engaging elements ($a_2$) are made of the same resin as the resin constituting the base plate ($a_1$);
  (3) the non-foam resin sheet (B) is directly laminated and integrated on the back surface of the male-type molded hook-and-loop fastener (A); and
  (4) the resin constituting the non-foam resin sheet (B) is a resin mainly composed of an elastomer resin of the same type as the resin constituting the male-type molded hook-and-loop fastener (A), and the resin constituting the non-foam resin sheet (B) has a lower hardness than the resin constituting the male-type molded hook-and-loop fastener (A).

Preferably, in such a male-type molded hook-and-loop fastener-equipped sheet, the resin constituting the male-type molded hook-and-loop fastener (A) is a resin mainly composed of any one of a polypropylene resin, a polyester-based elastomer resin, and a polyamide resin, and the resin constituting the male-type molded hook-and-loop fastener (A) has a type D durometer hardness in accordance with JIS K7215 in the range of 50 to 100, the resin constituting the non-foam resin sheet (B) has the same hardness in the range of 10 to 70, and the difference in hardness between the two is in the range of 20 to 60.

Preferably, in such a male-type molded hook-and-loop fastener-equipped sheet, the resin constituting the male-type molded hook-and-loop fastener (A) and the resin constituting the non-foam resin sheet (B) are any one of the following (5) to (7):
  (5) the resin constituting the male-type molded hook-and-loop fastener (A) is a resin mainly composed of a polypropylene resin, and the resin constituting the non-foam resin sheet (B) is a resin mainly composed of an olefin-based elastomer resin;
  (6) the resin constituting the male-type molded hook-and-loop fastener (A) and the resin constituting the non-foam resin sheet (B) are both resins mainly composed of a polyester-based elastomer; and
  (7) the resin constituting the male-type molded hook-and-loop fastener (A) is a resin mainly composed of a polyamide resin, and the resin constituting the non-foam resin sheet (B) is a resin mainly composed of a polyamide-based elastomer resin.

Preferably, in such a male-type molded hook-and-loop fastener-equipped sheet, the base plate ($a_1$) has a thickness of 0.15 to 0.30 mm, the non-foam resin sheet (B) has a thickness of 0.2 to 4 mm, and the thickness of the non-foam resin sheet (B) is equal to or greater than the thickness of the base plate ($a_1$).

Preferably, in such a male-type molded hook-and-loop fastener-equipped sheet, the male-type engaging element ($a_2$) of the male-type molded hook-and-loop fastener (A) has an inverted J-shape or a Y-shape, and the height from the base plate ($a_1$) to the top portion of the male-type engaging element ($a_2$) is 0.2 to 1.5 mm.

More preferably, in such a male-type molded hook-and-loop fastener-equipped sheet, the base plate ($a_1$) has a ridge-shaped raised portion continuous in the row direction of the engaging elements ($a_2$), the male-type engaging elements ($a_2$) rise from above the ridge-shaped raised portion, and the rows of the male-type engaging elements ($a_2$) are formed along the ridges of the continuous ridge-shaped raised portion.

The present invention also provides a method for producing a male-type molded hook-and-loop fastener-equipped sheet, including: setting a male-type molded hook-and-loop fastener (A) satisfying the following conditions (i) to (iii) in a concave portion provided in a die so that a male-type engaging element ($a_2$) is on the bottom surface side of the concave portion; injecting a melt of a non-foam resin satisfying the following condition (iii) into the die in that state; and taking out the product from the die after cooling:
  (i) the male-type molded hook-and-loop fastener (A) includes a resin-made base plate ($a_1$) and a plurality of male-type engaging elements ($a_2$) rising from the surface of the base plate ($a_1$) and arranged in a row on the base plate ($a_2$);
  (ii) the male-type engaging elements ($a_2$) are bent in the same direction as the row direction of the male-type engaging elements ($a_1$) from the middle thereof, the tip end portion thereof approaches the base plate ($a_1$), and the male-type engaging elements ($a_2$) are made of the same resin as the resin constituting the base plate ($a_1$);

(iii) the resin constituting the non-foam resin sheet (B) is a resin mainly composed of an elastomer resin of the same type as the resin constituting the male-type molded hook-and-loop fastener (A), and the resin constituting the non-foam resin sheet (B) has a lower hardness than the resin constituting the male-type molded hook-and-loop fastener (A).

In such a production method, preferably, the resin constituting the male-type molded hook-and-loop fastener (A) satisfies the following (iv), and the non-foam resin satisfies any one of the following (v) to (vii):

(iv) the resin constituting the male-type molded hook-and-loop fastener (A) is a resin mainly composed of any one of a polypropylene resin, a polyester-based elastomer resin, and a polyamide resin;

(v) when the resin constituting the male-type molded hook-and-loop fastener (A) is a resin mainly composed of a polypropylene resin, the non-foam resin is a resin mainly composed of an olefin-based elastomer resin;

(vi) when the resin constituting the male-type molded hook-and-loop fastener (A) is a resin mainly composed of a polyester-based elastomer, the non-foam resin is a resin mainly composed of a polyester-based elastomer resin;

(vii) when the resin constituting the male-type molded hook-and-loop fastener (A) is a resin mainly composed of a polyamide resin, the non-foam resin is a resin mainly composed of a polyamide-based elastomer resin.

Further, the present invention provides a method for producing a male-type molded hook-and-loop fastener-equipped sheet having a non-foam resin sheet (B) on the back surface of a male-type molded hook-and-loop fastener (A), the method including: flowing a melt of a resin that satisfies the following condition (III) onto the surface of a metal roll that satisfies the following conditions (I) and (II) and injecting the melt of the resin into a cavity; superposing and pressure-bonding a sheet (B) composed of a non-foam resin that satisfies the following condition (III) onto the surface of the resin melt on the metal roll; and cooling and solidifying the melt in that state and then peeling the sheet from the surface of the metal roll and pulling it out of the cavity:

(I) the metal roll is formed by superposing thin ring-shaped dies in which a plurality of cuts in the shape of male-type engaging elements are engraved on the outer circumference;

(II) on the surface of the metal roll, a plurality of cavities for male-type engaging elements based on the cuts are arranged in a row in the circumferential direction of the roll, each cavity is bent in the row direction of the cavity in the middle, and the tip end portion thereof approaches the surface of the metal roll;

(III) the non-foam resin is a resin mainly composed of an elastomer resin of the same type as the resin constituting the melt, and the non-foam resin has a lower hardness than the resin constituting the melt.

In such a production method, preferably, the melt satisfies the following (IV), and the non-foam resin satisfies any one of the following (V) to (VII):

(IV) the melt is a resin mainly composed of any one of a polypropylene resin, a polyester-based elastomer resin, and a polyamide resin;

(V) when the melt is a resin mainly composed of a polypropylene resin, the non-foam resin is a resin mainly composed of an olefin-based elastomer resin;

(VI) when the melt is a resin mainly composed of a polyester-based elastomer resin, the non-foam resin is a resin mainly composed of a polyester-based elastomer resin;

(VII) when the melt is a resin mainly composed of a polyamide resin, the non-foam resin is a resin mainly composed of a polyamide-based elastomer resin.

Furthermore, the present invention provides a method for producing a male-type molded hook-and-loop fastener-equipped sheet having a non-foam resin sheet (B) on the back surface of a male-type molded hook-and-loop fastener (A), the method including: superposing and pressure-bonding a sheet (B) composed of a non-foam resin that satisfies the following condition (iii) in a molten state onto the back surface of the male-type molded hook-and-loop fastener (A) that satisfies the following conditions (i) to (iii); and then cooling and solidifying the sheet:

(i) the male-type molded hook-and-loop fastener (A) includes a resin-made base plate ($a_1$) and a plurality of male-type engaging elements (at) rising from the surface of the base plate ($a_1$) and arranged in a row on the base plate ($a_1$);

(ii) the male-type engaging elements ($a_2$) are bent in the same direction as the row direction of the male-type engaging elements from the middle thereof, the tip end portion thereof approaches the base plate ($a_1$), and the male-type engaging elements ($a_2$) are made of the same resin as the resin constituting the base plate ($a_1$);

(iii) the resin constituting the non-foam resin sheet (B) is a resin mainly composed of an elastomer resin of the same type as the resin constituting the male-type molded hook-and-loop fastener (A), and the non-foam resin has a lower hardness than the resin constituting the male-type molded hook-and-loop fastener (A).

In such a production method, preferably, the resin constituting the male-type molded hook-and-loop fastener (A) satisfies the following (iv), and the non-foam resin satisfies any one of the following (v) to (vii):

(iv) the resin constituting the male-type molded hook-and-loop fastener (A) is a resin mainly composed of any one of a polypropylene resin, a polyester-based elastomer resin, and a polyamide resin;

(v) when the resin constituting the male-type molded hook-and-loop fastener (A) is a resin mainly composed of a polypropylene-based resin, the non-foam resin is a resin mainly composed of an olefin-based elastomer resin;

(vi) when the resin constituting the male-type molded hook-and-loop fastener (A) is a resin mainly composed of a polyester-based elastomer resin, the non-foam resin is a resin mainly composed of a polyester-based elastomer resin;

(vii) when the resin constituting the male-type molded hook-and-loop fastener (A) is a resin mainly composed of a polyamide resin, the non-foam resin is a resin mainly composed of a polyamide-based elastomer resin.

Advantageous Effects of Invention

In the male-type molded hook-and-loop fastener-equipped sheet and the method for producing the same according to the present invention, the male-type molded hook-and-loop fastener (A) is a molded hook-and-loop fastener in which the base plate ($a_1$) and the male-type engaging elements ($a_2$) are composed of the same resins, and therefore, vibration which causes a peeling sound generated in the male-type engaging elements ($a_2$) can be reliably received by the base plate ($a_1$).

Further, since the resin constituting the male-type molded hook-and-loop fastener (A) is of the same type as the non-foam resin sheet (B) which exists in close contact with the back surface thereof and has affinity, the vibration transmitted to the base plate ($a_1$) of the male-type molded hook-and-loop fastener (A) is reliably transmitted to the non-foam resin sheet (B) mainly composed of the elastomer resin and is reduced. In addition, the peeling sound is not an unpleasant noise such as a ripping sound but a calm and low peeling sound which is heard softly to the ear.

Further, since the non-foam resin sheet (B) composed of a specific resin excellent in adhesiveness to the male-type molded hook-and-loop fastener (A) is directly laminated and integrated on the back surface of the male-type molded hook-and-loop fastener (A), there is no adhesive layer, so that there is no problem that peeling occurs in the adhesive layer even if engagement and peeling are repeated.

The male-type engaging element ($a_2$) of the male-type molded hook-and-loop fastener (A) has a tapered shape when it is produced by being pulled out from the cavity. Therefore, the peeling sound itself of the male-type engaging element ($a_2$) generated at the time of peeling is basically small as compared with the case of a male-type engaging element made of thick and long monofilaments in which crystals are oriented in the longitudinal direction by stretching as in the case of a fabric-based hook-and-loop fastener.

The non-foam resin sheet (B) is firmly and directly laminated and integrated with the back surface of the base plate ($a_1$) when the non-foam resin sheet (B) is laminated and integrated with the male-type hook-and-loop fastener (A) by insert-molding or when the base plate ($a_1$) of the hook-and-loop fastener is superposed and pressure-bonded in a molten state at the time of molding the hook-and-loop fastener, so that the vibration generating the peeling sound generated in the male-type engaging element ($a_2$) at the time of peeling is reliably transmitted to the base plate ($a_1$).

Further, in the case where the male-type engaging element ($a_2$) has an inverted J-shape or Y-shape with a tapered tip end portion, the sound itself generated at the time of peeling is relatively small as compared with a male-type engaging element in which an expanded head portion larger than a shank portion of a T-shaped, arrowhead-shaped, or mushroom-shaped engaging element or the like which is generally used as a male-type engaging element in the case of a male-type molded hook-and-loop fastener is placed on the top portion of the shank portion.

Preferably, in the present invention, the male-type engaging element ($a_2$) is relatively low in height as compared with the male-type engaging element used in the conventional fabric-based hook-and-loop fastener or molded hook-and-loop fastener. In this case, the peeling sound itself is small. Preferably, the base plate ($a_1$) of the male-type molded hook-and-loop fastener (A) is bonded to the non-foam resin sheet (B) not only on the back surface but also on the side surface thereof, and more preferably, the base plate ($a_1$) is positioned below the surface of the non-foam resin sheet (B). As a result, the vibration of the peeling sound transmitted to the back surface of the male-type molded hook-and-loop fastener (A) can be reliably reduced by the non-foam resin sheet (B) covering the back surface of the base plate ($a_1$) and the periphery thereof.

BRIEF DESCRIPTION OF DRAWINGS

FIG. 1 is an enlarged perspective view schematically showing a corner portion of an example of the male-type molded hook-and-loop fastener-equipped sheet of the present invention.

FIG. 2 is a cross-sectional view schematically showing a part of a cross section of the male-type molded hook-and-loop fastener-equipped sheet according to the present invention as viewed from an arrow direction (P) in FIG. 1.

FIG. 3 is a cross-sectional view schematically showing a part of a cross section of the male-type molded hook-and-loop fastener-equipped sheet according to the present invention as viewed from an arrow direction (Q) in FIG. 1.

FIG. 4 is an enlarged perspective view schematically showing another example of the male-type molded hook-and-loop fastener-equipped sheet of the present invention.

DESCRIPTION OF EMBODIMENTS

Next, a male-type molded hook-and-loop fastener-equipped sheet of the present invention will be described in detail with reference to the drawings. FIG. 1 is an enlarged perspective view schematically showing a corner portion of an example of a male-type molded hook-and-loop fastener-equipped sheet of the present invention (in the case where the male-type engaging element ($a_2$) has an inverted J-shape), FIG. 2 is a cross-sectional view (side view) viewed from the direction of arrow P in FIG. 1, that is, a schematic cross-sectional view viewed from a direction orthogonal to the row direction of the male-type engaging element ($a_2$), and FIG. 3 is a cross-sectional view (side view) viewed from the direction of arrow Q in FIG. 1, that is, a schematic cross-sectional view viewed from the row direction of the male-type engaging element ($a_2$). FIG. 4 is an enlarged perspective view schematically showing another example of the male-type molded hook-and-loop fastener-equipped sheet of the present invention (in the case where the male-type engaging element ($a_2$) has a Y-shape).

As shown in FIG. 1, the male-type molded hook-and-loop fastener-equipped sheet of the present invention includes a male-type molded hook-and-loop fastener (A) and a non-foam resin sheet (B) directly integrated on the back surface side of the male-type molded hook-and-loop fastener (A).

The male-type molded hook-and-loop fastener (A) includes a base plate ($a_1$) and a plurality of (a lot of) reverse J-shaped male-type engaging elements ($a_2$) rising from the surface thereof as shown in FIGS. 1 and 2, or includes a base plate ($a_1$) and a plurality of (a lot of) Y-shaped male-type engaging elements ($a_2$) rising from the surface thereof as shown in FIG. 4.

Then, the male-type engaging elements ($a_1$) rise from the surface of the base plate ($a_1$) [preferably, as shown in FIGS. 1 to 4, the surface of the ridge-shaped raised portion ($a_3$) formed on the surface of the base plate ($a_1$) (in the present invention, the surface including the surface of the ridge-shaped raised portion (aa) formed on the surface of the base plate is referred to as the base plate surface)], and in some cases branch in the middle to form a Y-shape, and become gradually thinner from the root toward the tip. Preferably, as shown in FIG. 1, the male-type engaging elements ($a_2$) are bent in the same direction as the row direction of the male-type engaging elements ($a_2$) from the middle, and in the case of branching, as shown in FIG. 4, one of the branches after branching is in the same direction as the row direction of the male-type engagement elements ($a_2$), and another one of the branches is bent in a direction away from the branching counterpart, and the tip thereof has a shape approaching the base plate.

The male-type engaging element ($a_2$) preferably has a height from the base plate ($a_1$) to the top portion of the male-type engaging element ($a_2$) of 0.2 to 1.5 mm, and has a feature that the peeling sound is small because the height is relatively low compared with the T-shaped, arrowhead-shaped, or mushroom-shaped male-type engaging elements which are generally used in monofilament hook-type engaging elements and male-type molded hook-and-loop fasteners used in conventional fabric-based hook-and-loop fasteners or compared with the conventional inverted J-shaped male-type engaging elements. More preferably, the height is 0.55 to 1.2 mm in the case of an inverted J-shaped engaging element and 0.2 to 0.6 mm in the case of a Y-shaped engaging element.

Although the above-mentioned PTL 1 describes a woven hook-and-loop fastener as a main purpose in detail, a molded hook-and-loop fastener is also briefly mentioned. However, in this patent document, little attention has been paid to this molded hook-and-loop fastener, and no study has been made as to where and how this molded hook-and-loop fastener should be made in order to reduce the peeling sound, and it is merely described that a rubber layer is bonded to the back surface by an adhesive, and this alone does not have a high effect of reducing the peeling sound. In addition, in a state in which the rubber layer is bonded to the back surface of the woven fabric with an adhesive, when engagement and peeling are repeated, peeling is likely to occur in the adhesive layer, and the effect of reducing the peeling sound is also reduced. When a crosslinkable adhesive is used as the adhesive, the adhesiveness is improved, but on the contrary, the hook-and-loop fastener becomes hard and is not suitable for applications requiring flexibility such as clothing.

As a specific method for producing the male-type molded hook-and-loop fastener (A) used in the present invention, there is used a method for producing a sheet having a large number of male-type engaging elements ($a_2$) on the surface thereof by flowing a melt of a resin in the form of a sheet on the surface of a metal roll having a large number of cavities of a male-type engaging element shape on the surface thereof, press-fitting the melt into the cavities, peeling the melt from the surface of the metal roll after cooling and solidifying, and pulling the melt from the cavities at the same time.

More specifically, this production method by pulling out from the cavities is described. A ring-shaped die having a thickness of 0, 2 to 0.5 mm and having a cut in the shape of an inverted J-shaped or Y-shaped male-type engaging element ($a_2$) engraved on the outer circumference thereof, and a metal ring not engraved in such a cut are sequentially superposed on each other to prepare a die roll having a large number of cavities having a cut in the shape of a male-type engaging element on the outer circumference surface thereof.

In the case of a male-type engaging element that can be engaged in one direction as in an inverted J-shape, it is preferable to replace half of the ring-shaped dies with ring-shaped dies having a thickness of 0.2 to 0.5 mm in which an inverted J-shaped cut bent in a direction opposite to that of the above inverted J-shape is engraved on the outer circumference. In this case, an inverted J-shaped ring-shaped die bent in the reverse direction and an inverted J-shaped ring-shaped die bent in the forward direction may be alternately present, or every two or more ring-shaped dies may be alternately present.

In such a metal roll, a plurality of cavities which are bent in the circumferential direction of the metal roll are arranged in a row in the circumferential direction on the surface thereof, and further, such rows exist in parallel in the width direction of the metal roll, and in the case of an inverted J-shape, the bending direction of the cavities is reversed in units of one row or in units of a plurality of rows. In this case, whether it is an inverted J-shape or a Y-shape, the cavity is gradually tapered from the surface of the metal roll toward the tip end portion, and is gradually bent in the circumferential direction of the metal roll from the middle, and the tip end portion faces in a direction approaching the surface of the metal roll.

As a specific method for flow molding a molten resin on the surface of a metal roll, the resin melt is extruded and pressed into a gap between another drum roll located at a position opposite to the metal roll, thereby press-fitting and filling the cavity with the melt and forming a sheet having a uniform thickness on the surface of the roll, the melt in the cavity is cooled and solidified by a refrigerant constantly circulating in the roll while the die roll is rotating, the base plate ($a_1$) of the obtained male-type molded hook-and-loop fastener is stretched by a nip roller having a gap adjusted so as to have a uniform thickness, the cooled sheet is peeled off from the surface of the die roll and the male-type engaging element ($a_2$) is pulled out from the cavity.

Thus, a sheet-shaped product having a large number of male-type engaging elements ($a_2$) on the surface thereof, that is, a male-type molded hook-and-loop fastener (A) is obtained. In order to enhance the bonding property with the non-foam resin sheet (B) integrated with the back surface of the base plate ($a_1$), the surface of the drum roll may be provided with irregularities so that irregularities exist on the back surface of the base plate ($a_1$).

The resin constituting such a male-type molded hook-and-loop fastener (A) is a resin mainly composed of a resin of the same type as the elastomer resin constituting the non-foam resin sheet (B) in terms of bonding property to the non-foam resin sheet (B) which is directly laminated and integrated on the back surface of the base plate ($a_1$) and in terms of reduction of peeling sound.

In the present embodiment, "mainly" in "resin Y mainly composed of X" means that X has the largest content (mass) among the resins contained in the resin Y, and the content of X in the resin Y may be 50% by mass or more, 80% by mass or more, 90% by mass or more, or 100% by mass.

In addition, in the present embodiment, "Z-based resin" means that the constituent unit Z has the largest content (mass) among the constituent units of the Z-based resin, and the content of the constituent unit Z in the Z-based resin may be 50% by mass or more, 80% by mass, 90% by mass or more, or 100% by mass. "Z-based elastomer" has the same meaning as described above.

A preferable specific example of the resin constituting the male-type molded hook-and-loop fastener (A) is any one of a resin mainly composed of a non-elastomer polypropylene resin, a resin mainly composed of a polyester-based elastomer resin, and a resin mainly composed of a non-elastomer polyamide resin, since particularly a reduction in peeling sound can be obtained. Among them, a resin mainly composed of a polyester-based elastomer resin is particularly preferable because it can exhibit the effects of the present invention most remarkably.

The resin constituting the male-type molded hook-and-loop fastener (A) has a type D durometer hardness in accordance with JIS K7215 in the range of 50 to 100 from the viewpoint of the moldability and engaging force of the male-type molded hook-and-loop fastener. When the resin is soft so that the hardness of the resin is less than this range, the obtained male-type molded hook-and-loop fastener is likely to cause the base plate ($a_1$) to wave, the base plate ($a_1$) to tear in some places, and the engaging elements to bend. On the other hand, when the resin is hard so that the hardness of the resin exceeds this range, the male-type engaging element is easily broken or cracked when it is pulled out from the die, the obtained male-type molded hook-and-loop fastener is too hard and is not suitable for application fields requiring flexibility, and the loop-shaped engaging element of the loop-type hook-and-loop fastener to be engaged with is easily cut, causing problems in terms of durability. More preferably, the durometer hardness is in the range of 50 to 75, particularly preferably in the range of 60 to 70.

In the case where a resin mainly composed of a non-elastomer polypropylene resin is used as the resin constituting the male-type molded hook-and-loop fastener (A), not only the peeling sound is reduced but also the male-type engaging element ($a_2$) of the obtained male-type molded hook-and-loop fastener is hardly broken even when engagement and peeling are repeated, and excellent engaging force is obtained. Such a resin mainly composed of a polypropylene resin may be blended with a small amount of a resin which does not impair the performance of the polypropylene resin, for example, a polyolefin resin such as polyethylene, and it is preferable to blend a small amount of an olefin-based elastomer resin, for example, an ethylene-propylene rubber or a block copolymer of styrene and a hydrogenated conjugated diene, in order to easily pull out the resin from the cavity, to bond with the non-foam resin sheet (B) to be integrated on the back surface, and to further reduce the peeling sound itself. The blending amount is preferably an amount that satisfies a type D durometer hardness in accordance with JIS K7215 in the range of 50 to 100, for example, in the range of 2 to 15% by mass with respect to the polypropylene resin.

Further, various stabilizers, flame retardants, colorants and the like may be added to the male-type molded hook-and-loop fastener as necessary. The addition amount thereof is preferably 1 to 50% by mass with respect to the resin constituting the male-type molded hook-and-loop fastener.

In the case where a resin mainly composed of a polyester-based elastomer resin is used as the resin constituting the male-type molded hook-and-loop fastener (A), the polyester-based elastomer resin used for molding is preferably a resin obtained by copolymerizing polyoxytetramethylene glycol with a resin having a butylene terephthalate unit as a main repeating unit, and this resin sufficiently has properties of an elastic polymer in spite of its high elastic modulus. Therefore, the male-type molded hook-and-loop fastener produced from such a resin is most preferable among the resins used for the male-type molded hook-and-loop fastener of the present invention because the hook-and-loop fastener itself can reduce the peeling sound, has a high engaging force, and is extremely less likely to tear the male-type engaging element ($a_2$) or cut the loop-shaped engaging element of the engaging counterpart due to engagement and peeling.

The polyester-based elastomer resin used for the male-type molded hook-and-loop fastener preferably has a high proportion of polybutylene terephthalate as a hard segment and a low proportion of polyoxytetramethylene glycol as a soft segment in the polyester-based elastomer resin, and as a result, it is preferable that the polyester-based elastomer resin satisfies a type D durometer hardness in accordance with JIS K7215 in the range of 50 to 100.

As for polyester-based elastomer resins, those having various durometer hardness from high to low are commercially available, and therefore, those satisfying the above-mentioned durometer hardness may be selected from them. When the polyester-based elastomer resin having such a durometer hardness is used, the obtained male-type molded hook-and-loop fastener has advantages such that the male-type engaging element ($a_2$) is not easily broken even when engagement and peeling are repeated, excellent engaging force is obtained, and further the obtained male-type molded hook-and-loop fastener is not torn from the perforation even when the obtained male-type molded hook-and-loop fastener is attached by sewing, in addition to reduction of the peeling sound.

A small amount of another resin, for example, a polyester resin, may be blended into such a resin mainly composed of a polyester-based elastomer resin within a range that does not impair the performance. Further, various stabilizers, flame retardants, colorants and the like may be added to the male-type molded hook-and-loop fastener as necessary. The addition amount thereof is preferably 1 to 50% by mass with respect to the resin constituting the male-type molded hook-and-loop fastener. It should be noted that the durometer hardness referred to in the present invention is a value obtained only from the resin before the addition of such an additive.

Further, in the present invention, when a resin mainly composed of a polyamide resin is used as a resin for molding the male-type molded hook-and-loop fastener (A), nylon 6, nylon 66, nylon 11, nylon 12 and the like are cited as examples of the polyamide resin used therein, and among them, nylon 6 is excellent in flexibility and moldability, and nylon 6 is cited as a preferable example because, in addition to reduction of the peeling sound, the engaging element ($a_2$) is not broken when it is pulled out from the cavity during molding, the engaging element ($a_2$) is not broken due to engagement and peeling, excellent engaging force can be obtained, and the loop-shaped engaging element as the engaging counterpart is not cut.

As for these polyamide resins, resins having various hardnesses ranging from high durometer hardness to low durometer hardness due to modification or the like are commercially available. In addition, a small amount, for example, 15% by mass or less of an elastomer resin or the like may be blended within a range satisfying a type D durometer hardness in accordance with JIS K7215 in the range of 50 to 100. Of course, also in the case of this resin, various stabilizers, flame retardants, colorants and the like may be added as necessary. The addition amount thereof is preferably 1 to 50% by mass with respect to the resin constituting the male-type molded hook-and-loop fastener.

As shown in FIG. 1, FIG. 2, and FIG. 4, in the male-type molded hook-and-loop fastener (A) obtained from such a resin, the male-type engaging element ($a_2$) is gradually tapered from the root toward the tip end portion (i.e., the root becomes thicker and thinner toward the tip), and is gradually bent from the middle, and the tip end portion faces in a direction approaching the base plate ($a_1$), and a plurality of male-type engaging elements ($a_2$) are arranged in a row in the same direction as the direction in which the male-type engaging element ($a_2$) is bent, and in the case of an inverted J-shaped male-type engaging element, the direction in which the male-type engaging element ($a_2$) is bent in one row or in a plurality of rows is reversed.

Further, in the present invention, it is preferable that the cross-sectional shape of the top portion of the male-type engaging element ($a_2$) is a shape in which the width of the male-type engaging element ($a_2$) is larger than the thickness of the male-type engaging element. More specifically, this means that the width (W) of the male-type engaging element at the top portion of the male-type engaging element shown in FIG. 2 and FIG. 3 is larger than the thickness (S) of the male-type engaging element, i.e., W>S. By satisfying this, it is possible to prevent the male-type engaging element ($a_2$) from being cut or the bent portion of the engaging element ($a_2$) from being cracked when the engaging element ($a_1$) is pulled out from the cavity during the molding of the male-type molded hook-and-loop fastener (A), and further prevent the loop fiber of the engaging counterpart from being cut.

According to the present invention, as a preferable size of the male-type engaging element ($a_2$), based on FIG. 2 and FIG. 3, the height of the male-type engaging element ($a_2$) [that is, the height from the base plate ($a_1$) to the top portion of the male-type engaging element ($a_2$): H] is 0.2 to 1.5 mm, more preferably H is 0.55 to 1.2 mm when the male-type engaging element ($a_2$) has an inverted J-shape, H is 0.2 to 0.6 mm when the male-type engaging element ($a_2$) has a Y-shape, the extent (C) of the root portion is 0.2 to 1.0 mm, more preferably 0.25 to 0.8 mm, and the ratio of C/H is 0.6 to 2.5, more preferably 0.65 to 2.0. As described above, it is preferable that the root of the engaging element is thick and the tip thereof is thin, and the height of the engaging element ($a_2$) is low, from the viewpoint of difficulty in falling of the engaging element ($a_2$), from the viewpoint of engaging force, and from the viewpoint of small peeling sound.

In the case where the male-type engaging element ($a_2$) has an inverted J-shape, it is preferable that the extent (D shown in FIG. 2) at a position of a height of ⅔ of the height of the engaging element from the root is 0.15 to 0.4 mm, and the male-type engaging element ($a_2$) gradually starts to bend from the vicinity of ½ to ¾ of the height of the engaging element from the root.

On the other hand, in the case where the male-type engaging element ($a_2$) has a Y-shape, it is preferable that the male-type engaging element ($a_2$) is branched in the vicinity of 60 to 80% of the height of H from the base plate ($a_1$), each branched branch extends in a direction away from the branched counterpart branch and is bent in a direction parallel to the base plate ($a_1$), and the tip end portion is bent in a direction approaching the base plate ($a_1$).

The width (W) of the male-type engaging element at the top portion of the male-type engaging element ($a_2$) shown in FIG. 3 is preferably 0.15 to 0.4 mm, regardless of whether it is an inverted J-shape or a Y-shape, and the width of the male-type engaging element (ad may be the same from the root to the tip end portion of the male-type engaging element or may be tapered toward the tip end portion. However, in the case where the above-described ring-shaped die is used, the width of the male-type engaging element ($a_2$) is inevitably substantially the same from the root to the tip end portion of the male-type engaging element ($a_2$). The thickness (S) of the top portion of the male-type engaging element ($a_2$) is preferably 0.1 to 0.3 mm and smaller than the above-mentioned W.

The base plate ($a_1$) serving as a base on which such male-type engaging elements ($a_2$) rise preferably has a thickness [not including the ridge-shaped raised portion ($a_3$)] in the range of 0.15 to 0.30 mm from the viewpoint of flexibility and strength to be able to conform to even a curved surface. When the thickness is larger than this range, it is difficult for the molten resin to penetrate to the tip end portion of the cavity during molding, and it is difficult to obtain the male-type engaging element ($a_2$) having a perfect shape. More preferably, the thickness is in the range of 0.2 to 0.28 mm.

The density of the male-type engaging elements ($a_2$) present on the base plate ($a_1$) is preferably in the range of 60 to 160 pieces/cm², and particularly preferably 80 to 140 pieces/cm².

In the male-type molded hook-and-loop fastener (A), as shown in FIG. 1 and FIG. 4, a plurality of male-type engaging elements ($a_2$) are arranged in a row in the same direction as the bending direction of the male-type engaging elements ($a_2$), and as shown in FIG. 2, the interval (E) between adjacent male-type engaging elements in the row direction is preferably 1.2 to 2.2 mm, that is, the male-type engaging element ($a_2$) is preferably present at a rate of one in row length of 1.2 to 2.2 mm. More preferably, the rate is one in 1.3 to 1.8 mm.

Further, the interval between adjacent engaging element rows (interval between adjacent rows including one engaging element row) is preferably in the range of 0.4 to 1.0 mm, that is, one row of male-type engaging elements is preferably present on abase plate ($a_1$) in a width of 0.4 to 1.0 mm. More preferably, there is one row of male-type engaging elements in a width of 0.5 to 0.8 mm.

As described above, it is preferable that the male-type engaging element ($a_2$) rises from the surface of the ridge-shaped raised portion ($a_3$) formed on the surface of the base plate ($a_1$). In order to achieve this, a method of making the diameter of the ring-shaped die for the engaging elements slightly smaller than the diameter of the ring-shaped die having no engaging elements, a method of shifting the center of the ring-shaped die, or the like is used. In this case, the height of the ridge-shaped raised portion ($a_3$) is preferably 2 to 20% of the height (H) of the male-type engaging element.

In the present invention, it is not necessary that all of the male-type engaging elements ($a_2$) rise from the surface of the ridge-shaped raised portion ($a_3$) formed on the base plate surface. Even when some of the male-type engaging elements ($a_2$) rise from the surface of the ridge-shaped raised portion ($a_3$), a certain effect can be obtained. Preferably, 30% or more of the male-type engaging elements of all male-type engaging elements rise from the surface of the ridge-shaped raised portion ($a_3$).

The non-foam resin sheet (B) is integrated with the back surface of the male-type molded hook-and-loop fastener (A). Further, the non-foam resin sheet (B) is not integrated with the back surface of the male-type molded hook-and-loop fastener (A) via an adhesive or a pressure-sensitive adhesive or the like, but is directly laminated and integrated therewith.

As a suitable method for obtaining a sheet in which the non-foam resin sheet (B) is directly laminated and integrated on the back surface of the male-type molded hook-and-loop fastener (A), there are the following three methods.

First Method

The first method is a method for producing a male-type molded hook-and-loop fastener-equipped sheet, including: setting a male-type molded hook-and-loop fastener (A) satisfying the following conditions (i) to (iii) in a concave portion provided in a die so that a male-type engaging element ($a_1$) is on the bottom surface side of the concave portion; injecting a melt of a non-foam resin satisfying the following condition (iii) into the die in that state; and taking out the product from the die after cooling:
  (i) the male-type molded hook-and-loop fastener (A) includes a resin-made base plate ($a_1$) and a plurality of (a lot of) male-type engaging elements ($a_2$) rising from the surface of the base plate ($a_1$) and arranged in a row on the base plate ($a_1$);
  (ii) the male-type engaging elements ($a_2$) are bent in the same direction as the row direction of the male-type engaging elements ($a_2$) from the middle thereof, the tip end portion thereof approaches the base plate ($a_1$), and the male-type engaging elements ($a_2$) are made of the same resin as the resin constituting the base plate ($a_1$);
  (iii) the resin constituting the male-type molded hook-and-loop fastener (A) is a resin mainly composed of any one of a polypropylene resin, a polyester-based elastomer resin, and a polyamide resin, and the non-foam resin is a resin mainly composed of an elastomer resin of the same type as the resin constituting the male-type molded hook-and-loop fastener (A).

Second Method

The second method is a method for producing a male-type molded hook-and-loop fastener-equipped sheet having a non-foam resin sheet (B) on the back surface of a male-type molded hook-and-loop fastener (A), the method including: flowing a melt of a resin that satisfies the following condition (III) onto the surface of a metal roll that satisfies the following conditions (I) and (II) and press-fitting the melt of the resin into the cavity; superposing and pressure-bonding a sheet composed of a non-foam resin that satisfies the following condition (III) onto the surface of the resin melt on the metal roll; and cooling and solidifying the melt in that state and then peeling the sheet from the surface of the metal roll and pulling it out of the cavity:
  (I) the metal roll is formed by superposing thin ring-shaped dies in which a plurality of (a lot of) cuts in the shape of male-type engaging elements are engraved on the outer circumference;
  (II) on the surface of the metal roll, a plurality of (a lot of) cavities for male-type engaging elements based on the cuts are arranged in a row in the circumferential direction of the roll, each cavity is bent in the row direction of the cavity in the middle, and the tip end portion thereof approaches the surface of the metal roll;
  (III) the resin constituting the melt is a resin mainly composed of any one of a polypropylene resin, a polyester-based elastomer resin, and a polyamide resin, and the non-foam resin is a resin mainly composed of an elastomer resin of the same type as the resin constituting the melt.

Third Method

The third method is a method for producing a male-type molded hook-and-loop fastener-equipped sheet having a non-foam resin sheet (B) on the back surface of a male-type molded hook-and-loop fastener (A), the method including: superposing and pressure-bonding a sheet (B) composed of a non-foam resin that satisfies the following condition (iii) in a molten state onto the back surface of the male-type molded hook-and-loop fastener (A) that satisfies the following conditions (i) to (ii); and then cooling and solidifying the sheet:
  (i) the male-type molded hook-and-loop fastener (A) includes a resin-made base plate ($a_1$) and a plurality of (a lot of) male-type engaging elements ($a_1$) rising from the surface of the base plate ($a_1$) and arranged in a row on the base plate ($a_1$);
  (ii) the male-type engaging elements ($a_2$) are bent in the same direction as the row direction of the male-type engaging elements from the middle thereof, the tip end portion thereof approaches the base plate ($a_1$), and the male-type engaging elements ($a_2$) are made of the same resin as the resin constituting the base plate ($a_1$);
  (iii) the resin constituting the non-foam resin sheet (B) is a resin mainly composed of an elastomer resin of the same type as the resin constituting the male-type molded hook-and-loop fastener (A), and the non-foam resin has a lower hardness than the resin constituting the male-type molded hook-and-loop fastener (A).

Specifically, the first method is a method of directly laminating and integrating the non-foam resin sheet (B) on the back surface of the male-type molded hook-and-loop fastener (A) by setting the previously molded male-type molded hook-and-loop fastener (A) in a die and injecting and molding the resin for the non-foam resin sheet (B) in the die in this state; and on the other hand, the second method is a method of directly laminating and integrating the non-foam resin sheet (B) on the back surface of the male-type molded hook-and-loop fastener (A) by superposing and pressure-bonding the non-foam resin sheet (B) previously molded into a sheet shape on the back surface side of the base plate ($a_1$) of the obtained male-type molded hook-and-loop fastener (A) before the base plate ($a_1$) is solidified, when molding the male-type molded hook-and-loop fastener (A); and further, the third method is a method of directly laminating and integrating the non-foam resin sheet (B) on the back surface of the male-type molded hook-and-loop fastener (A) by superposing and pressure-bonding the non-foam resin sheet (B) on the back surface of the previously molded male-type molded hook-and-loop fastener (A) at the time when the non-foam resin sheet (B) has a molten state.

Examples of the method for obtaining a sheet in which the non-foam resin sheet (B) is directly laminated and integrated on the back surface of the male-type molded hook-and-loop fastener (A) include, in addition to the first to third methods, a method in which the back surface of the base plate ($a_1$) of the previously molded male-type molded hook-and-loop fastener (A) and the surface to which the non-foam resin sheet (B) is to be bonded are heated to a temperature close to melting, respectively, and the heated surfaces of the male-type molded hook-and-loop fastener (A) and the non-foam resin sheet (B) are superposed, and pressure-bonded and integrated; and a method in which a molten resin for the non-foam resin sheet (B) is extruded into a sheet shape onto the back surface of the base plate ($a_1$) before it is solidified during molding of the male-type molded hook-and-loop fastener (A), and is superposed, and pressure-bonded and integrated, but the above-mentioned first to third methods, particularly the second and third methods are preferable because a homogeneous laminated integrated product can be easily obtained.

However, in the case of the second method, when the male-type molded hook-and-loop fastener (A) is molded, the presence of the non-foam resin sheet (B) pressure-bonded to the back surface side sometimes makes it difficult to press-fit the resin to the tip end portion of the cavity, so that the third method is most preferable in consideration of this.

In the case of the above-mentioned first method described above, the back surface side of the base plate ($a_1$) of the male-type molded hook-and-loop fastener (A) is melted by the heat from the melt of the non-foam resin, and since it has excellent compatibility with the non-foam resin liquid, it is fused to the surface of the non-foam resin sheet (B), so that they are firmly laminated and integrated.

Further, in the case of the above-mentioned second method, the surface of the non-foam resin sheet (B) on the side in contact with the male-type molded hook-and-loop fastener (A) is melted by the heat from the melt of the resin for the male-type molded hook-and-loop fastener (A), and since the non-foam resin sheet (B) has excellent compatibility with the melt of the resin for the male-type molded hook-and-loop fastener (A), the non-foam resin sheet (B) is fused with the male-type molded hook-and-loop fastener (A) and they are firmly laminated and integrated.

In the case of the above-mentioned third method, the surface of the male-type molded hook-and-loop fastener (A) on the side in contact with the non-foam resin sheet (B) is melted or softened by the heat from the melt of the resin for the non-foam resin sheet (B), and since the male-type molded hook-and-loop fastener (A) has excellent in compatibility with the melt of the non-foam resin sheet (B), the male-type molded hook-and-loop fastener (A) is fused with the non-foam resin sheet (B) and they are firmly laminated and integrated.

In addition, in the case of the first method, the melt of the non-foam resin easily penetrates up to the surface of the male-type engaging element of the male-type molded hook-and-loop fastener (A), and as a result, the male-type engaging element ($a_2$) is easily buried in the non-foam resin, and it is necessary to take measures against this. On the other hand, since it is not necessary to take such measures in the case of the second and third methods, it can be said that the second and third methods are superior in terms of productivity. However, in the case of the above-mentioned first method, there are advantages in that it is possible to easily produce a non-foam resin sheet (B) in which the male-type molded hook-and-loop fastener (A) sinks into the non-foam resin sheet (B) and which is more excellent in quietness, and in that the thickness and shape of the non-foam resin sheet (B) can be freely changed.

The resin for the non-foam resin sheet (B) and the resin for the male-type molded hook-and-loop fastener (A) are required to satisfy the following conditions: the resin constituting the non-foam resin sheet (B) is a resin mainly composed of an elastomer resin of the same type as the resin constituting the male-type molded hook-and-loop fastener (A), and the resin constituting the non-foam resin sheet (B) has a lower hardness than the resin constituting the male-type molded hook-and-loop fastener (A).

Specific examples of the elastomer resin of the same type as the resin constituting the male-type molded hook-and-loop fastener (A), include: when the resin constituting the male-type molded hook-and-loop fastener (A) is a resin mainly composed of a non-elastomer polypropylene resin, as the resin constituting the non-foam resin sheet (B), a resin mainly composed of an olefin-based elastomer resin; when the resin constituting the male-type molded hook-and-loop fastener (A) is a resin mainly composed of a polyester-based elastomer resin, as the resin constituting the non-foam resin sheet (B), a resin mainly composed of a polyester-based elastomer resin; and when the resin constituting the male-type molded hook-and-loop fastener (A) is a resin mainly composed of a non-elastomer polyamide resin such as nylon 6, as the resin constituting the non-foam resin sheet (B), a resin mainly composed of a polyamide-based elastomer resin.

In the case of these combinations, there can be obtained the merits of excellent quietness, excellent peeling resistance of the male-type molded hook-and-loop fastener (A) and the non-foam resin sheet (B), and excellent flexibility of the bonded integrated sheet.

Particularly, in order to enhance the effect of reducing the peeling sound, it is preferable that the resin constituting the non-foam resin sheet (B) has a Type D durometer hardness in accordance with JIS K 7215 within the range of 10 to 70, and that the difference in Type D durometer hardness in accordance with JIS K 7215 from the resin constituting the male-type molded hook-and-loop fastener is within the range of 20 to 60. It is most preferable that the resin constituting the non-foam resin sheet (B) has the hardness within the range of 20 to 45, and that the difference in Type D durometer hardness in accordance with JIS K 7215 from the resin constituting the male-type molded hook-and-loop fastener is within the range of 25 to 50.

Next, a combination of the above resins will be described. First, the case of a combination of the polypropylene resin and the olefin-based elastomer resin will be described. When the resin constituting the male-type molded hook-and-loop fastener (A) is a resin mainly composed of a polypropylene resin, a resin mainly composed of an olefin-based elastomer resin is used as the resin constituting the non-foam resin sheet (B).

Examples of the olefin-based elastomer include a resin having a polyolefin such as polypropylene or polyethylene as a hard segment component and an olefin-based rubber such as ethylene-propylene rubber as a soft segment component, and a block copolymer having a polystyrene as a hard segment component and a hydrogenated polyolefin of a conjugated diene as a soft segment component. The hardness can be changed by changing the ratio of the hard segment component to the soft segment component. The olefin-based elastomer resin may be mixed with a polypropylene resin or a polystyrene resin in order to achieve the above-mentioned hardness, and the mixing mass ratio of the olefin-based elastomer resin and the polypropylene resin or the polystyrene resin is preferably in the range of 50:50 to 100:0 from the viewpoints of quietness, sewing property, flexibility, and the like. It is preferable that inorganic fine particles such as barium sulfate and carbon black are added in an appropriate amount to the olefin-based elastomer resin constituting the non-foam sheet (B). The preferable amount thereof is in the range of 10 to 80% by mass, and more preferably 20 to 50% by mass.

Next, the case of a combination of the polyester-based elastomer resins will be described. Since the polyester-based elastomer resins are the same, when producing the male-type molded hook-and-loop fastener (A), if the base plate (ad is made thicker, it is reasonable to obtain a product which is as thick as a product in which a non-foam resin sheet is integrated on the back surface, thereby saving the labor of laminating and integrating the non-foam resin sheet on the back surface, but the combination of resins having the same hardness cannot achieve the present invention.

That is, the polyester-based elastomer resin constituting the male-type molded hook-and-loop fastener and the polyester-based elastomer resin constituting the non-foam resin sheet (B) on the back surface must be different in hardness as described above. That is, when the non-foam resin sheet (B) on the back surface is produced from the polyester-based elastomer resin constituting the male-type molded hook-and-loop fastener (A), satisfactory reduction in peeling sound cannot be obtained, and conversely, when the male-type molded hook-and-loop fastener (A) is produced from the polyester-based elastomer resin constituting the non-foam resin sheet (B) on the back surface, the moldability is inferior, the base plate ($a_1$) has waviness or tears, and a hook-and-loop fastener having a sufficient engaging force cannot be obtained. Furthermore, inorganic fine particles such as barium sulfate and carbon black are preferably added in an appropriate amount to the resin mainly composed of a polyester-based elastomer resin used for the non-foam resin sheet (B) as described later, and the appropriate amount is in the range of 10 to 80% by mass, and more preferably 20 to 50%, but when such a resin is used for the male-type molded hook-and-loop fastener (A), the resin is particularly difficult to penetrate to the tip end portion of the cavity.

The polyester-based elastomer resin used for the non-foam resin sheet (B) preferably has a low proportion of polybutylene terephthalate as a hard segment and a high proportion of polyoxytetramethylene glycol as a soft segment in the polyester-based elastomer resin, and as a result, it is preferable that the polyester-based elastomer resin satisfies a durometer hardness (type D) in accordance with JIS K7215 in the range of 10 to 70.

As for such polyester-based elastomer resins, those satisfying the above-mentioned durometer hardness may be selected from those commercially available. When the polyester-based elastomer resin having such a durometer hardness is used, in addition to the reduction of the peeling sound, even when the hook-and-loop fastener is attached by sewing, there is an advantage that the hook-and-loop fastener is not torn from the perforation because of the presence of the base plate ($a_1$) having a high hardness. Further, a small amount of another resin, for example, a polyester resin, may be blended into such a resin mainly composed of a polyester-based elastomer resin within a range that does not impair the performance and is not departing from the above hardness range.

Next, the case of a combination of the polyamide resin and the polyamide-based elastomer resin will be described. The polyamide-based elastomer resin is an elastomer having a polyamide block such as nylon 6 block, nylon 11 block, or nylon 12 block as a hard segment component and a polyether such as polyethylene glycol or polytetramethylene glycol or an aliphatic polyester as a soft segment component, and those having various hardnesses can be obtained by changing the constituent units of the hard segment component and the soft segment component and further changing the ratio, and these are commercially available, and a resin satisfying the above hardness range may be selected therefrom. A non-elastomer polyamide resin may be mixed with the resin mainly composed of the polyamide-based elastomer resin within a range not departing from the above hardness range.

To the resin constituting the non-foam resin sheet (B), fillers such as barium sulfate powder and calcium carbonate powder, various stabilizers, flame retardants, colorants, and the like may be added in an appropriate amount. The appropriate amount is in the range of 10 to 80% by mass, and more preferably 20 to 50%.

In the present invention, preferably, as shown in FIG. 1 to FIG. 3, not only the back surface of the base plate ($a_1$) but also the side surface thereof are directly bonded to the resin constituting the non-foam resin sheet (B), and more preferably, as shown in FIG. 1 to FIG. 3, the base plate (at) of the male-type molded hook-and-loop fastener (A) is positioned below the front surface of the non-foam resin sheet (B) (that is, the base plate ($a_1$) is recessed in the non-foam resin sheet (B)).

Since the side surface of the base plate ($a_1$) is also directly bonded to the resin constituting the non-foam resin sheet (B), the sound generated when the male-type molded hook-and-loop fastener (A) is peeled off can be more effectively reduced. Further, since the base plate ($a_1$) is positioned below the surface of the non-foam resin sheet (B), it can be further effectively reduced. In order that the back surface and the side surface of the base plate ($a_1$) are directly bonded to the resin constituting the non-foam resin sheet (B), it is preferably produced by using the above-described first method.

To be specific, in the above-described insert molding method, it is preferable to adopt a method in which the male-type engaging element ($a_2$) is fitted into a concave portion in a die, the male-type molded hook-and-loop fastener (A) is set in the die so that the base plate (at) protrudes from the concave portion, and the non-foam resin liquid for the non-foam resin sheet (B) is injected into the die in this state.

Furthermore, in order to ensure that the base plate ($a_1$) is positioned below the surface of the non-foam resin sheet (B), the male-type molded hook-and-loop fastener (A) may be set in the die so that the entire base plate ($a_1$) protrudes from the inner wall of the die toward the inside of the die.

In the first method, as described above, when the non-foam resin liquid is injected into the die, the resin liquid may flow into the surface side of the male-type engaging element of the male-type molded hook-and-loop fastener (A) set in the die, and the male-type engaging element ($a_1$) may be covered with the resin, and the engaging force may be lost. In order to prevent this, it is preferable to cover the surface side of the male-type molded engaging element with a covering material such as silicon rubber, water-soluble resin, film, or non-woven fabric before setting it in the die.

When the side surface of the base plate ($a_1$) is also directly bonded to the resin constituting the non-foam resin sheet (B), particularly when the side surface of the base plate ($a_1$) is also directly bonded to the resin constituting the non-foam resin sheet (B), and the base plate ($a_1$) is positioned below the surface of the non-foam resin sheet (B), since it is difficult to set the male-type hook-and-loop fastener in the die and the resin liquid easily flows into the surface side of the male-type engaging element of the male-type molded hook-and-loop fastener (A) set in the die, it is preferable to cover the engaging element surface with a covering material. In this case, it is preferable that the covering material does not cover the back surface and the side surface of the base plate ($a_1$).

When the surface side of the male-type engaging element is covered with a covering material, it is necessary to remove the covering material covering the male-type engaging element surface of the male-type molded hook-and-loop fastener (A) after the molded product is taken out from the die. Furthermore, it is also possible to use a method in which only the periphery of the engaging element group is covered with silicon rubber or water-soluble resin, instead of covering the entire surface of the surface side of the male-type engaging element.

Further, in the present invention, it is preferable that the non-foam resin sheet (B) has a thickness of 0.2 to 4 mm and the thickness of the non-foam resin sheet (B) is equal to or more than the thickness of the base plate ($a_1$). In such a case, it is preferable that the sound at the time of peeling can be efficiently silenced, and the quietness male-type molded hook-and-loop fastener-equipped sheet has flexibility, curved surface conformability, and strength. More preferably, the thickness of the non-foam resin sheet (B) is 0.3 to 2.5 mm, which is 1.2 to 15 times the thickness of the base plate ($a_1$). The thickness of the non-foam resin sheet (B) referred to herein is the thickness of only the non-foam resin sheet (B) excluding the thickness of the male-type molded hook-and-loop fastener (A) at the location where the male-type molded hook-and-loop fastener (A) is integrated.

In addition, the resin sheet (B) needs to be non-foam, and in the case of a foamed porous state, the effect of reducing the peeling sound is hardly exhibited.

The non-foam resin sheet (B) may be provided with holes for inserting metal fittings so that the hook-and-loop fastener-equipped resin sheet (B) of the present invention can be connected to metal fittings or the like, or may be integrated with a fabric or the like on the back surface side so that hook-and-loop fastener-equipped resin sheet can be easily attached by sewing.

As the female-type hook-and-loop fastener to be engaged with the quietness male-type molded hook-and-loop fastener-equipped sheet of the present invention, a hook-and-loop fastener having a conventional loop-type engaging element can be used, and in particular, a quietness-type hook-and-loop fastener having a silencing elastomer resin layer attached to the back surface of the hook-and-loop fastener is preferable, and the silencing effect is further enhanced by the synergistic effect of the silencing effect of the quietness male-type molded hook-and-loop fastener-equipped sheet of the present invention and the female-type hook-and-loop fastener.

The quietness male-type molded hook-and-loop fastener-equipped sheet of the present invention can be used in all fields in which a male-type hook-and-loop fastener is used, but is particularly used in application fields in which silence is required, for example, clothes for infants, clothes, shoes, helmets, and tents for military, binders for military, other sports gloves, and the like.

As a specific attachment method, various methods such as a method of fixing the back surface of the sheet of the present invention to an attachment object with an adhesive or a pressure-sensitive adhesive, a method of fixing the back surface to an attachment object by sewing, and a method of providing a hole penetrating in the sheet width direction at an end portion of the sheet of the present invention and attaching a metal fitting to the hole to thereby fix the sheet to an object can be used. In particular, the quietness male-type molded hook-and-loop fastener-equipped sheet of the present invention is excellent in flexibility because of the presence of a sheet containing an elastomer resin on the back surface, and excellent in touch feeling because of the small size of the male-type engaging element on the front surface. Therefore, it is suitable for being attached to clothes or the like by sewing by utilizing this property.

As described above, when both the male-type molded hook-and-loop fastener (A) on the front surface side and the non-foam resin sheet (B) on the back surface side are made of a polyester-based elastomer resin, the male-type molded hook-and-loop fastener-equipped sheet of the present invention is less likely to be torn from a perforation, and is suitable for use in attaching to clothes, tools, or the like by sewing.

EXAMPLES

Hereinafter, the present invention will be described in detail with reference to Examples. As for the engaging force of the male-type molded hook-and-loop fastener, an initial engaging force and an engaging force at the time when peeling engagement was repeated 1000 times were measured in accordance with the method of JIS L3416. As the loop-shaped engaging element serving as an engaging counterpart in this case, a sheet obtained by integrating a 2-mm-thick sheet made of a polyester-based elastomer resin (Hytrel 3046 manufactured by Du Pont-Toray Co., Ltd.) with ALTECO as an adhesive on the back surface of a woven hook-and-loop fastener made of polyethylene terephthalate ("MAGIC TAPE" (registered trademark) B9750Y.00 manufactured by Kuraray Fastening Co., Ltd.) was used. Then, the loop hook-and-loop fastener was replaced with a new one every 50 times of repetition of engagement and peeling.

Furthermore, the loudness of the peeling sound at that point was also measured. The peeling sound of the hook-and-loop fastener at that time was measured in accordance with JIS Z8731. Specifically, a noise level meter ("NA-20" manufactured by Rion Co., Ltd.) is used to set the frequency characteristic A and the dynamic characteristic AST. As an engaging counterpart, a loop hook-and-loop fastener-equipped sheet having a size of 30 mm in length and 140 mm in width was used, which was obtained by integrating the above polyester-based elastomer resin sheet with an adhesive on the back surface of a woven hook-and-loop fastener with loop-shaped engaging elements, having a size of 20 mm in length and 80 mm in width. The measurement interval between the hook-and-loop fastener and the noise level meter was defined as 10 cm, and the indicated value of the noise level meter at the time of peeling was read. The loudness of the sound at the time of peeling was expressed in dB (decibel). In the human auditory sense, the difference of 10 db is sensed as the sound volume difference of about twice. This peeling sound test was also replaced with a new one after 50 times of engagement and peeling.

Example 1

[Production of Male-Type Molded Hook-and-Loop Fastener (A)]

As a die, a ring-shaped die having a thickness of 0.20 mm and a diameter of 211.8 mm in which the shape of a hook-type engaging element (an inverted J-shaped engaging element) is engraved on the outer circumference, a metal ring having a thickness of 0.30 mm and a diameter of 212 mm in which the outer circumference surface of which is not engraved with such a shape and is flat, a ring-shaped die having a thickness of 0.20 mm and a diameter of 211.8 mm obtained by engraving a hook-type engaging element shape facing in the opposite direction to the above-mentioned hook-type engaging element shape on the outer circumference, and a metal ring having a thickness of 0.30 mm and a diameter of 212 mm in which the outer circumference surface of which is not engraved with such a shape and is flat, are successively superposed to prepare a die roll having a width of 120 mm in which a large number of cavities having a hook-type engaging element shape and a large number of cavities having a hook-type engaging element shape facing in the opposite direction are provided on the outer circumference surface thereof.

A molten material of a thermoplastic polyester-based elastomer resin (Hytrel 6347 manufactured by Du Pont-Toray Co., Ltd.; durometer hardness (Type D): 63) was extruded into a gap between the die roll and another drum roll located at a position opposite to the die roll, and pressed to fill the cavity with the resin to form a sheet having a uniform thickness on the roll surface. After cooling the resin in the cavity with water that is constantly circulating in the roll while the die roll is rotating, the sheet was stretched by a nip roll whose gap is adjusted so that the base plate has a thickness of 0.20 mm, and the cooled and solidified sheet was peeled off from the surface of the die roll to produce a male-type molded hook-and-loop fastener (A).

Only the surface of the male-type engaging element side of the male-type molded hook-and-loop fastener (A) thus obtained was covered with silicon rubber, and cut into a piece having a length of 80 mm and a width of 20 mm in the male-type engaging element row direction.

Next, in a state where the male-type molded hook-and-loop fastener (A) was set in a concave portion in a die so that the group of male-type engaging elements was on the bottom surface side of the concave portion, and the base plate of the hook-and-loop fastener protruded from the concave portion and further protruded from the inner wall surface of the die, a melt containing 70 parts by mass of a thermoplastic polyester-based elastomer resin (Hytrel 3046 manufactured by Du Pont-Toray Co., Ltd.; durometer hardness (Type D): 27) and 30 parts by mass of barium sulfate was injected into the die, cooled, and then taken out from the die, and the silicon rubber covering the surface of the hook-and-loop fastener was removed.

The resulting male-type molded hook-and-loop fastener-equipped sheet had a shape as shown in FIG. 1, that is, the inverted J-shaped male-type molded hook-and-loop fastener had a shape in which the inverted J-shaped male-type molded hook-and-loop fastener had a large number of male-type engaging elements ($a_2$) that were gradually tapered from the root to the tip, gradually bent from the middle, and the tip end portion faced in a direction slightly approaching the base plate, a plurality of male-type engaging elements ($a_2$) were arranged in a row in the same direction as the direction in which the inverted J-shaped male-type engaging elements were bent, and further had a shape in which the direction in which the inverted J-shaped male-type engaging elements were bent was reversed for each row.

The shape of the male-type engaging element ($a_2$) of the male-type molded hook-and-loop fastener was as shown in FIG. 1, the height (H) of the male-type engaging element was 0.90 mm from the base plate surface, and the lower end portion at the tip end portion of the male-type engaging element approached the base plate by a distance equivalent to 5% of the height (H) of the male-type engaging element with respect to the height of the lower end portion at the top portion of the male-type engaging element. Further, the width (W) of the male-type engaging element at the top portion was 0.20 mm, the thickness (S) of the male-type engaging element at the top portion was 0.09 mm, the extent (C) of the root portion of the engaging element was 0.76 mm, the male-type engaging element ($a_2$) began to bend gradually from around a height of ⅔ of the height of the engaging element from the root, the density of the male-type engaging element ($a_2$) was 136 pieces/cm$^2$, the thickness of the base plate was 0.20 mm, the interval (E) between the male-type engaging elements adjacent in the row direction was 1.50 mm, and the interval between adjacent rows of engaging elements was 0.50 mm. In addition, as shown in FIGS. 1 to 3, a ridge-shaped raised portion having a height of 0.10 mm continuous in the row direction of the male-type engaging elements was present on the surface of the base plate, and the male-type engaging elements rose from above the ridge-shaped raised portion.

The sheet (B) composed of a soft polyester-based elastomer resin and barium sulfate, in which the male-type molded hook-and-loop fastener is integrated on the surface, had a thickness of 2.2 mm, the male-type molded hook-and-loop fastener (A) was directly laminated and integrated on the surface of the sheet (B) with the male-type engaging element surface facing outward, and around the male-type molded hook-and-loop fastener (A), wide 5 mm (a region corresponding to the longitudinal direction of the 20 mm of the hook-and-loop fastener) and wide 5 mm and 55 mm (a region corresponding to the wide 40 mm) in which the hook-and-loop fastener was not integrated and the sheet surface was exposed were present so as to surround the hook-and-loop fastener (A). Both the back surface and the side surface of the base plate were directly bonded to the resin constituting the sheet (B), and the surface of the hook-and-loop fastener (A) was in a positional relationship that was deeper than the surface of the sheet. With respect to the male-type molded hook-and-loop fastener-equipped sheet thus obtained, the engaging force and the maximum sound pressure (dB) between frequencies of 2 kHz and 20 kHz of the peeling sound were measured. The results are shown in Table 1.

Comparative Example 1

In Example 1, without integrating the non-foam resin sheet (B) on the back surface of the male-type molded hook-and-loop fastener (A), the engaging force and the maximum sound pressure (dB) between frequencies of 2 kHz and 20 kHz of the peeling sound were measured in the state of the male-type molded hook-and-loop fastener. The results are also shown in Table 1.

Comparative Example 2

A male-type molded hook-and-loop fastener-equipped sheet was obtained in the same manner as in Example 1, except that a resin composed of 70 parts by mass of the same thermoplastic polyester-based elastomer resin (Hytrel 6347 manufactured by Du Pont-Toray Co., Ltd.: durometer hardness: 63) as used in the production of the male-type molded hook-and-loop fastener (A) and 30 parts by mass of barium sulfate was used as the resin to be injected into the die in which the male-type molded hook-and-loop fastener (A) was set. Then, in the same manner as in Example 1, the engaging force and the maximum sound pressure (dB) between frequencies of 2 kHz and 20 kHz of the peeling sound were measured. The results are also shown in Table 1.

Comparative Example 3

Comparative Example 3 was carried out in the same manner as in Example 1, except that the same thermoplastic polyester-based elastomer resin (Hytrel 3046 manufactured by Du Pont-Toray Co., Ltd.; durometer hardness: 27) as that of the sheet to be integrated with the back surface was used as the resin used in the production of the male-type molded hook-and-loop fastener (A) in Example 1. However, when the male-type molded hook-and-loop fastener (A) was peeled off from the roll surface in the molding step, the base plate of the hook-and-loop fastener (A) was broken or waved. Then, the sheet (B) was integrated on the back surface by the same method as in Example 1 using the portion where breakage did not occur, thereby obtaining a male-type molded hook-and-loop fastener-equipped sheet. Then, in the same manner as in Example 1, the engaging force and the maximum sound pressure (dB) between frequencies of 2 kHz and 20 kHz of the peeling sound were measured. The results are also shown in Table 1.

Comparative Example 4

In Example 1, a sheet composed of 70 parts by mass of a thermoplastic polyester-based elastomer resin (Hytrel 3046 manufactured by Du Pont-Toray Co., Ltd.; durometer hardness (type D): 27) and 30 parts by mass of barium sulfate having a thickness of 2.2 mm was bonded to the back surface of the male-type molded hook-and-loop fastener (A) using an instantaneous adhesive (cyanoacrylate) as an adhesive. Then, in the same manner as in Example 1, the engaging force and the maximum sound pressure (dB) between frequencies of 2 kHz and 20 kHz of the peeling sound were measured. The results are also shown in Table 1.

TABLE 1

|  | Initial values | | Values after repeating engagement and peeling 100 times | |
|---|---|---|---|---|
|  | Engaging force Peel strength (N/cm) | Peeling sound (DB) | Engaging force Peel strength (N/cm) | Peeling sound (DB) |
| Example 1 | 0.21 | 91 | 0.2 | 90 |
| Comparative Example 1 | 0.39 | 100 | 0.37 | 99 |
| Comparative Example 2 | 0.15 | 95 | 0.14 | 93 |
| Comparative Example 3 | 0.07 | 85 | 0.05 | 85 |
| Comparative Example 4 | 0.19 | 92 | peeling at the bonding portion | — |

As is apparent from the above Table 1, the male-type molded hook-and-loop fastener-equipped sheet of Example 1 was extremely excellent in the initial engaging force and the engaging force after repeating engagement and peeling 100 times, and further, the peeling sound at that time was extremely quiet, and in the case of slow peeling, the sound was a low and calm sound as generated when bubbles on the water surface continuously burst, and was remarkably quiet as compared with the peeling sound of the conventional hook-and-loop fastener.

Further, even when this male-type molded hook-and-loop fastener-equipped sheet was attached to the surface of a cotton woven fabric by sewing and engagement and peeling with a loop-type hook-and-loop fastener were repeated 2000 times, the male-type molded hook-and-loop fastener-equipped sheet did not tear at all from the perforations.

On the other hand, in the case of the male-type molded hook-and-loop fastener of Comparative Example 1, the engaging force was as excellent as that of Example 1, the peeling sound was much larger than that of Example 1, although it was improved to some extent as compared with the fabric-based hook-and-loop fastener and the like, and the sound itself was an unpleasant sound that sounded a ripping sound like the peeling sound of the conventional hook-and-loop fastener.

Further, in the case of the male-type molded hook-and-loop fastener-equipped sheet of Comparative Example 2, the engaging force was as excellent as that of Example 1, but the peeling sound was somewhat improved as compared with Comparative Example 1, but it was still not at a satisfactory level, and the sound was not gentle to the ear as in Example 1.

Further, in the case of Comparative Example 3, the engaging force was significantly inferior to that of Example 1 in the initial engaging force, and it did not have the basic performance required as a general-purpose hook-and-loop fastener.

Further, in the case of Comparative Example 4, there was no problem in the engaging force, but the male-type molded hook-and-loop fastener-equipped sheet was harder than that of Example 1 and was not suitable for application fields requiring flexibility. Furthermore, as for the peeling sound, while repeated engagement and peeling, the bonding portion peeled and the sound gradually became a loud harsh sound.

Example 2

A male-type molded hook-and-loop fastener-equipped sheet was obtained in exactly the same manner as in Example 1 except that, as the resin constituting the male-type molded hook-and-loop fastener (A), resin pellets (type D durometer hardness in accordance with JIS K7215: 60) obtained by adding 20% by mass of an olefin-based elastomer resin (ethylene-propylene rubber having a soft segment proportion of 50% by mass) to a polypropylene resin were used, and as the resin for the non-foam resin sheet (B) to be bonded and integrated on the back surface thereof, a mixture composed of 50 parts by mass of an olefin-based elastomer (ethylene-propylene rubber having a soft segment proportion of 50% by mass), 20 parts by mass of polypropylene, and 30 parts by mass of barium sulfate was used (the type D durometer hardness in accordance with JIS K7215 of the mixed resin of the olefin-based elastomer and the polypropylene having the above composition is 30). Then, in the same manner as in Example 1, the engaging force and the maximum sound pressure (dB) between frequencies of 2 kHz and 20 kHz of the peeling sound were measured. The results are shown in Table 2.

Example 3

A male-type molded hook-and-loop fastener-equipped sheet was obtained in exactly the same manner as in Example 1, except that nylon 6 (Amilan U121 manufactured by Toray Industries, Inc.; type D durometer hardness in accordance with JIS K7215: 95) was used as the resin constituting the male-type molded hook-and-loop fastener (A), and a mixture composed of 70 parts by mass of polyamide-based elastomer resin (XPA product number 9068X1 manufactured by Ube Industries, Inc.; type D durometer hardness in accordance with JIS K7215: 68) and 30 parts by mass of barium sulphate was used as the resin for the non-foam resin sheet (B) to be bonded and integrated on the back surface thereof. Then, in the same manner as in Example 1, the engaging force and the maximum sound pressure (dB) between frequencies of 2 kHz and 20 kHz of the peeling sound were measured. The results are shown in Table 2.

Comparative Example 5

A sheet made of the same barium sulfate-containing resin as that used in Example 2 having a thickness of 2.5 mm was bonded to the back surface of the male-type molded hook-and-loop fastener produced in Example 2 using an instantaneous adhesive (cyanoacrylate) as an adhesive. Then, in the same manner as in Example 1, the engaging force and the maximum sound pressure (dB) between frequencies of 2 kHz and 20 kHz of the peeling sound were measured. The results are shown in Table 2.

Example 4

A male-type molded hook-and-loop fastener made of a polyester-based elastomer resin was produced in the same manner as in Example 1, except that in Example 1, the height of the male-type engaging elements was changed to 0.4 mm, the density of the male-type engaging elements was set to 147 pieces/cm², and a die roll in which the bending directions of the male-type engaging elements were forward and reverse in a row unit was used, and a male-type molded hook-and-loop fastener-equipped sheet in which a non-foam resin sheet (B) having a thickness of 2.8 mm was bonded and integrated to the back surface thereof was obtained in the same manner as in Example 1.

The male-type molded hook-and-loop fastener (A) present on the surface of the obtained male-type molded hook-and-loop fastener-equipped sheet has a lower engaging element height, a higher engaging element density, and a smaller shape, arrangement and the like than that of Example 1. With respect to the male-type molded hook-and-loop fastener-equipped sheet thus obtained, the engaging force and the maximum sound pressure (dB) between frequencies of 2 kHz and 20 kHz of the peeling sound were measured. The results are shown in Table 2.

Example 5

In Example 1, the above-mentioned second method was used as a method for producing a male-type molded hook-and-loop fastener-equipped sheet. In other words, a male-type molded hook-and-loop fastener-equipped sheet having a non-foam resin sheet (B) having a thickness of 2.3 mm on the back surface of a male-type molded hook-and-loop fastener (A) having a J-shaped engaging element was produced by flowing the same resin melt as in Example 1 on the surface of the same metal roll as used in Example 1 and injecting the melt of the same resin into the cavity, further on the surface of the resin melt on the metal roll, superposing and pressure-bonding a sheet composed of 50 parts by mass of a polyester-based elastomer resin and 30 parts by mass of barium sulfate having a thickness of 2.5 mm, which is the same as that of the resin mixture for the sheet of Example 1, cooling and solidifying the melt in that state, and then peeling from the surface of the metal roll and pulling it out of the cavity. Then, in the same manner as in Example 1, the engaging force and the maximum sound pressure (dB) between frequencies of 2 kHz and 20 kHz of the peeling sound were measured. The results are shown in Table 2.

Comparative Example 6

A natural rubber sheet having a thickness of 2.5 mm (type D durometer hardness in accordance with JIS K7215 is 30) was bonded to the back surface of a commercially available fabric-based hook-type hook-and-loop fastener [A8693Y.00 manufactured by Kuraray Fastening Co., Ltd.: the hook-shaped engaging element is made of a polyester-based monofilament having a diameter of 0.19 mm and has a height of 1.85 mm] using an instantaneous adhesive (cyanoacrylate). Then, the engaging force and the peeling sound of this fabric-based hook-type hook-and-loop fastener with a natural rubber sheet were measured in the same manner as in the above Examples and Comparative Examples. The results are shown in Table 2.

Comparative Example 7

To the back surface of the male-type molded hook-and-loop fastener produced in Example 2, a natural rubber sheet having a thickness of 2.5 mm (type D durometer hardness in accordance with JIS K7215 is 30) was bonded using an instantaneous adhesive (cyanoacrylate) as an adhesive in the same manner as in Comparative Example 5. Then, the engaging force and the peeling sound of this male-type molded hook-and-loop fastener with a natural rubber sheet were measured in the same manner as in the above Examples and Comparative Examples. The results are shown in Table 2.

Example 6

A male-type molded hook-and-loop fastener having Y-shaped male-type engaging elements was produced in the same manner as in Example 1, except that the shape of the hook-type engaging elements engraved on the outer circumference of the ring-shaped die used as the die in Example 1 was replaced with a Y-shaped one having a branched tip portion bent in a direction approaching the outer circumference.

The shape of the male-type engaging element of the obtained male-type molded hook-and-loop fastener (A) was Y-shaped as shown in FIG. 4, the height (H) of the male-type engaging element was 0.4 mm from the base plate surface, and the lower end portion at the tip end portion of the male-type engaging element approached the base plate by a distance equivalent to 5% of the height (H) of the male-type engaging element with respect to the height of the lower end portion at the top portion of the male-type engaging element. Further, the width (W) of the male-type engaging element at the top portion was 0.15 mm, the thickness (S) of the male-type engaging element at the top portion was 0.09 mm, the density of the male-type engaging element was 147 pieces/cm², the thickness of the base plate was 0.20 mm, the interval (E) between the male-type engaging elements adjacent in the row direction was 1.15 mm, and the interval between adjacent rows of engaging elements was 0.20 mm. In addition, as shown in FIG. 4, a ridge-shaped raised portion ($a_3$) having a height of 0.10 mm continuous in the row direction of the male-type engaging elements was present on the surface of the base plate, and the male-type engaging elements ($a_2$) rose from above the ridge-shaped raised portion ($a_3$), and each branch branched in a Y-shape also extended in the ridge direction of the ridge-shaped raised portion. The male-type engaging elements ($a_2$) were tapered from the root toward the tip end portion.

On the back surface of the male-type molded hook-and-loop fastener (A), a non-foam resin sheet having a thickness of 2.5 mm made of the same barium sulfate-containing resin as in Example 1 was directly integrated by the same molding method as in Example 1. In the obtained integrated product, around the male-type molded hook-and-loop fastener (A), wide 5 mm (a region corresponding to the longitudinal direction of the 20 mm of the hook-and-loop fastener) and wide 5 mm and 55 mm (a region corresponding to the wide 40 mm) in which the hook-and-loop fastener was not integrated and the sheet surface was exposed were present so as to surround the hook-and-loop fastener (A). Both the back surface and the side surface of the base plate were directly bonded to the resin constituting the sheet, and the surface of the hook-and-loop fastener (A) was in a positional relationship that was deeper than the surface of the sheet. With respect to the male-type molded hook-and-loop fastener-equipped sheet thus obtained, the engaging force and the maximum sound pressure (dB) between frequencies of 2 kHz and 20 kHz of the peeling sound were measured. The results are shown in Table 2.

Comparative Example 8

A male-type molded hook-and-loop fastener-equipped sheet was produced in the same manner as in Example 2, by using, as the resin for the non-foam resin sheet (B) to be bonded and integrated on the back surface, a mixture obtained by adding 30 parts by mass of barium sulfate to 70 parts by mass of resin pellets (type D durometer hardness in accordance with JIS K7215: 65) obtained by adding 20% by mass of an olefin-based elastomer resin (ethylene-propylene rubber having a soft segment proportion of 50% by mass) to a polypropylene resin and used as the resin constituting the male-type molded hook-and-loop fastener (A). Then, in the same manner as in Example 2, the engaging force and the maximum sound pressure (dB) between frequencies of 2 kHz and 20 kHz of the peeling sound were measured. The results are also shown in the following Table 2.

Comparative Example 9

A male-type molded hook-and-loop fastener-equipped sheet was produced in the same manner as in Example 3, by using, as the resin for the non-foam resin sheet (B) to be bonded and integrated on the back surface, a mixture obtained by adding 30 parts by mass of barium sulfate to 70 parts by mass of nylon 6 (Amilan U121 manufactured by Toray Industries, Inc.; type D durometer hardness in accordance with JIS K7215: 95) resin which was used as the resin constituting the male-type molded hook-and-loop fastener (A). Then, in the same manner as in Example 2, the engaging force and the maximum sound pressure (dB) between frequencies of 2 kHz and 20 kHz of the peeling sound were measured. The results are also shown in the following Table 2.

Comparative Example 10

A male-type molded hook-and-loop fastener-equipped sheet was obtained in the same manner as in Example 2 except that, as the resin constituting the male-type molded hook-and-loop fastener (A), a mixture composed of 60 parts by mass of an olefin-based elastomer resin (ethylene-propylene rubber having a soft segment proportion of 50% by mass), 10 parts by mass of polypropylene, and 30 parts by mass of barium sulfate (the type D durometer hardness in accordance with JIS K7215 of the mixed resin of the olefin-based elastomer and the polypropylene having the above composition is 25), which was used as the resin for the non-foam resin sheet (B) to be bonded and integrated on the back surface thereof, was used. Then, in the same manner as in Example 2, the engaging force and the maximum sound pressure (dB) between frequencies of 2 kHz and 20 kHz of the peeling sound were measured. The results are also shown in the following Table 2.

TABLE 2

|  | Initial values | | Values after repeating engagement and peeling 100 times | |
| --- | --- | --- | --- | --- |
|  | Engaging force Peel strength (N/cm) | Peeling sound (DB) | Engaging force Peel strength (N/cm) | Peeling sound (DB) |
| Example 2 | 0.19 | 90 | 0.17 | 88 |
| Example 3 | 0.21 | 91 | 0.19 | 89 |
| Comparative Example 5 | 0.2 | 92 | peeling at the bonding portion | — |
| Example 4 | 0.2 | 87 | 0.19 | 86 |
| Example 5 | 0.21 | 89 | 0.19 | 88 |
| Comparative Example 6 | 0.72 | 98 | peeling at the bonding portion | — |
| Comparative Example 7 | 0.22 | 96 | peeling at the bonding portion | — |
| Example 6 | 0.2 | 88 | 0.19 | 87 |
| Comparative Example 8 | 0.12 | 94 | 0.11 | 92 |
| Comparative Example 9 | 0.14 | 96 | 0.12 | 93 |
| Comparative Example 10 | 0.17 | 89 | 0.15 | 86 |
| Example 7 | 0.23 | 89 | 0.22 | 88 |

As is apparent from the above Table 2, although the male-type molded hook-and-loop fastener-equipped sheets of Examples 2 and 3 were slightly inferior to that of Example 1, they were excellent in the initial engaging force and the engaging force after repeating engagement and peeling 100 times, and further, the peeling sound at that time was quiet, and was remarkably quiet as compared with the peeling sound of the conventional hook-and-loop fastener.

Also, in the cases of Example 4 and Example 5, the peeling sound was extremely quiet similarly to that of Example 1, and was remarkably quiet as compared with the peeling sound of the conventional hook-and-loop fastener. In addition, the engaging force was also excellent, and this excellent performance hardly changed even when the engagement and peeling were repeated. Further, in Example 6, although the shape of the male-type engaging element is different from that of other Examples, it can be seen that, regardless of the shape of the male-type engaging element, it has excellent engaging force and the effect of reducing the peeling sound.

On the other hand, in the case of Comparative Example 5, although the engaging force was slightly inferior to that of Example 1, an excellent value was obtained. However, as for the peeling sound, as engagement and peeling were repeated, the sound gradually increased and became harsh, and as compared with that of Example 2, the peeling sound after repeated use was much inferior to that of Example 2, which was not satisfactory.

In Comparative Example 6, a rubber sheet was bonded to the back surface of a fabric hook-and-loop fastener. However, the peeling sound was largely inferior because the ripping noise in the case of a conventional fabric hook-and-loop fastener was slightly reduced. Furthermore, when engagement and peeling were repeated, the back surface of the engaging element was easily peeled off from the rubber sheet due to the tension at that time, and the peeling sound tended to be further increased.

Further, in Comparative Example 7, in which a rubber sheet was bonded to the back surface of a molded hook-and-loop fastener, the peeling sound was somewhat improved compared with that of Comparative Example 6, but was inferior to that of any of the above Examples, and further, when engagement and peeling were repeated, the peeling sound became even higher as in the case of Comparative Example 5.

Furthermore, in both Comparative Examples 8 and 9, the resins constituting the sheet integrated on the back surface are the same as the resins constituting the molded hook-and-loop fastener. However, all of the male-type molded hook-and-loop fastener-equipped sheets obtained in these Comparative Examples cannot be attached to clothes or the like because they have an extremely low silencing effect of the peeling sound and are extremely rigid, and the merits of having a quietness sheet integrated on the back surface cannot be found.

In addition, similarly to Comparative Example 3, Comparative Example 10 was significantly inferior to that of Example 2 in the initial engaging force, and did not have the basic performance required as a hook-and-loop fastener.

Example 7

In Example 1, the above-mentioned third method was used as a method for producing a male-type molded hook-and-loop fastener-equipped sheet. That is, on the back surface of the male-type molded hook-and-loop fastener (A) produced in Example 1, a molten sheet composed of 70 parts by mass of a thermoplastic polyester-based elastomer resin (Hytrel 3046 manufactured by Du Pont-Toray Co., Ltd.; durometer hardness (type D): 27) and 30 parts by mass of barium sulfate having a thickness of 2.2 mm was superposed, pressure-bonded, and cooled to obtain a male-type molded hook-and-loop fastener (A) having a non-foam resin sheet (B) composed of a soft polyester-based elastomer resin and barium sulfate integrated on the back surface.

The sheet (B) in the resultant integrated product had a thickness of 2.2 mm, the sheet (B) was directly laminated and integrated on the back surface of the male-type molded hook-and-loop fastener (A), both the back surface and the side surface of the base plate of the male-type molded hook-and-loop fastener (A) were directly bonded to the resins constituting the non-foam resin sheet (B), and the surface of the male-type molded hook-and-loop fastener (A) was in a positional relationship that was deeper than the surface of the sheet (B) at the portion where the male-type molded hook-and-loop fastener (A) was not bonded. The engaging force and the loudness of peeling sound of the male-type molded hook-and-loop fastener-equipped sheet thus obtained were measured.

As a result, the initial engaging force (peel strength) was 0.23 N/cm, the initial peeling sound was 89 DB, the engaging force (peel strength) after repeating the engagement and peeling 100 times was 0.22 N/cm, the initial peeling sound was 88 DB, and it was found that all of them had excellent engaging strength and quietness almost similar to those of Example 1. In addition, unlike Example 1, there was no need to take measures to prevent the resin of the sheet (B) from flowing into the surface of the engaging elements, and it was excellent in terms of simplicity of the process.

REFERENCE SIGNS LIST

A: Male-type molded hook-and-loop fastener
B: Non-foam resin sheet
$a_1$: Base plate
$a_2$: Male-type engaging element
$a_3$: Ridge-shaped raised portion
H: Height from base plate to the top portion of male-type engaging element
E: Interval between male-type engaging elements adjacent in row direction
C: Extent of male-type engaging element root portion
S: Thickness of male-type engaging element in top portion
D: Extent at a position of a height of ⅔ of the height from the root of the engaging element
W: Width of male-type engaging element in top portion

The invention claimed is:

1. A male-type molded hook-and-loop fastener-equipped sheet, comprising:
a male-type molded hook-and-loop fastener (A), and a non-foam resin sheet (B) integrated on the back surface of the male-type molded hook-and-loop fastener (A), wherein the male-type molded hook-and-loop fastener-equipped sheet satisfies the following conditions (1) to (4):
(1) the male-type molded hook-and-loop fastener (A) includes a resin-made base plate (a1) and a plurality of male-type engaging elements (a2) rising from the surface of the base plate (a1) and arranged in a row on the base plate (a1);
(2) the male-type engaging elements (a2) are bent in the same direction as the row direction of the male-type engaging elements from the middle thereof, the tip end portion of the male-type engaging elements (a2) approaches the base plate (a1), and the male-type engaging elements (a2) are made of the same resin as the resin constituting the base plate (a1);
(3) the non-foam resin sheet (B) is directly laminated and integrated on the back surface of the male-type molded hook-and-loop fastener (A); and
(4) the resin constituting the non-foam resin sheet (B) is a resin mainly composed of an elastomer resin of the same type as the resin constituting the male-type molded hook-and-loop fastener (A), and the resin constituting the non-foam resin sheet (B) has a lower hardness than the resin constituting the male-type molded hook-and-loop fastener (A).

2. The male-type molded hook-and-loop fastener-equipped sheet according to claim 1, wherein the resin constituting the male-type molded hook-and-loop fastener (A) is a resin mainly composed of any one of a polypropylene resin, a polyester-based elastomer resin, and a polyamide resin.

3. The male-type molded hook-and-loop fastener-equipped sheet according to claim 1, wherein the resin constituting the male-type molded hook-and-loop fastener (A) has a type D durometer hardness in accordance with JIS K7215 in the range of 50 to 100, the resin constituting the non-foam resin sheet (B) has a type D durometer hardness in the range of 10 to 70, and the difference in hardness between the resin constituting the male-type molded hook-and-loop fastener (A) and the resin constituting the non-foam resin sheet (B) is in the range of 20 to 60.

4. The male-type molded hook-and-loop fastener-equipped sheet according to claim 1, wherein the resin constituting the male-type molded hook-and-loop fastener (A) and the resin constituting the non-foam resin sheet (B) are any one of the following (5) to (7):
(5) the resin constituting the male-type molded hook-and-loop fastener (A) is a resin mainly composed of a polypropylene resin, and the resin constituting the non-foam resin sheet (B) is a resin mainly composed of an olefin-based elastomer resin;
(6) the resin constituting the male-type molded hook-and-loop fastener (A) and the resin constituting the non-foam resin sheet (B) are both resins mainly composed of a polyester-based elastomer resin; and
(7) the resin constituting the male-type molded hook-and-loop fastener (A) is a resin mainly composed of a polyamide-based resin, and the resin constituting the non-foam resin sheet (B) is a resin mainly composed of a polyamide-based elastomer resin.

5. The male-type molded hook-and-loop fastener-equipped sheet according to claim 1, wherein the base plate (a1) has a thickness of 0.15 to 0.30 mm, the non-foam resin sheet (B) has a thickness of 0.2 to 4 mm, and the thickness of the non-foam resin sheet (B) is equal to or greater than the thickness of the base plate (a1).

6. The male-type molded hook-and-loop fastener-equipped sheet according to claim 1, wherein the male-type engaging element (a2) of the male-type molded hook-and-loop fastener (A) has an inverted J-shape or a Y-shape, and the height from the base plate (a1) to the top portion of the male-type engaging element (a2) is 0.2 to 1.5 mm.

7. The male-type molded hook-and-loop fastener-equipped sheet according to claim 1, wherein the base plate (a1) has a ridge-shaped raised portion continuous in the row direction of the male-type engaging elements (a2), the male-type engaging elements (a2) rise from above the ridge-shaped raised portion, and the rows of the male-type engaging elements (a2) are formed along the ridges of the continuous ridge-shaped raised portion.

8. A method for producing a male-type molded hook-and-loop fastener-equipped sheet, comprising:
 setting a male-type molded hook-and-loop fastener (A) satisfying the following conditions (i) to (iii) in a concave portion provided in a die so that a male-type engaging element (a2) is on the bottom surface side of the concave portion;
 injecting a melt of a non-foam resin satisfying the following condition (iii) into the die in that state; and
 taking out the product from the die after cooling;
 wherein the conditions (i) to (iii) are as follows:
 (i) the male-type molded hook-and-loop fastener (A) includes a resin-made base plate (a1) and a plurality of male-type engaging elements (a2) rising from the surface of the base plate (a1) and arranged in a row on the base plate (a1);
 (ii) the male-type engaging elements (a2) are bent in the same direction as the row direction of the male-type engaging elements from the middle thereof, the tip end portion of the male-type engaging elements (a2) approaches the base plate (a1), and the male-type engaging elements (a2) are made of the same resin as the resin constituting the base plate (a1);
 (iii) the non-foam resin is a resin mainly composed of an elastomer resin of the same type as the resin constituting the male-type molded hook-and-loop fastener (A), and the non-foam resin has a lower hardness than the resin constituting the male-type molded hook-and-loop fastener (A).

9. The method for producing a male-type molded hook-and-loop fastener-equipped sheet according to claim 8, wherein the resin constituting the male-type molded hook-and-loop fastener (A) satisfies the following (iv), and the non-foam resin satisfies any one of the following (v) to (vii):
 (iv) the resin constituting the male-type molded hook-and-loop fastener (A) is a resin mainly composed of any one of a polypropylene resin, a polyester-based elastomer resin, and a polyamide resin;
 (v) when the resin constituting the male-type molded hook-and-loop fastener (A) is a resin mainly composed of a polypropylene resin, the non-foam resin is a resin mainly composed of an olefin-based elastomer resin;
 (vi) when the resin constituting the male-type molded hook-and-loop fastener (A) is a resin mainly composed of a polyester-based elastomer resin, the non-foam resin is a resin mainly composed of a polyester-based elastomer resin;
 (vii) when the resin constituting the male-type molded hook-and-loop fastener (A) is a resin mainly composed of a polyamide resin, the non-foam resin is a resin mainly composed of a polyamide-based elastomer resin.

10. A method for producing a male-type molded hook-and-loop fastener-equipped sheet having a non-foam resin sheet (B) on the back surface of a male-type molded hook-and-loop fastener (A), the method comprising:
 flowing a melt of a resin that satisfies the following condition (III) onto the surface of a metal roll that satisfies the following conditions (I) and (II) and press-fitting the melt of the resin into a cavity;
 superposing and pressure-bonding a sheet (B) composed of a non-foam resin that satisfies the following condition (III) onto the surface of the resin melt on the metal roll; and
 cooling and solidifying the melt in that state and then peeling the sheet from the surface of the metal roll and pulling it out of the cavity;
 wherein the conditions (I) to (III) are as follows:
 (I) the metal roll is formed by superposing thin ring-shaped dies in which a plurality of cuts in the shape of male-type engaging elements are engraved on the outer circumference;
 (II) on the surface of the metal roll, a plurality of cavities for male-type engaging elements based on the cuts are arranged in a row in the circumferential direction of the roll, each cavity is bent in the row direction of the cavity in the middle, and the tip end portion of each cavity approaches the surface of the metal roll;
 (III) the non-foam resin is a resin mainly composed of an elastomer resin of the same type as the resin constituting the melt, and the non-foam resin has a lower hardness than the resin constituting the melt.

11. The method for producing a male-type molded hook-and-loop fastener-equipped sheet according to claim 10, wherein the resin constituting the melt satisfies the following (IV), and the non-foam resin satisfies any one of the following (V) to (VII):
 (IV) the resin constituting the melt is a resin mainly composed of any one of a polypropylene resin, a polyester-based elastomer resin, and a polyamide resin;
 (V) when the resin constituting the melt is a resin mainly composed of a polypropylene resin, the non-foam resin is a resin mainly composed of an olefin-based elastomer resin;
 (VI) when the resin constituting the melt is a resin mainly composed of a polyester-based elastomer resin, the non-foam resin is a resin mainly composed of a polyester-based elastomer resin;
 (VII) when the resin constituting the melt is a resin mainly composed of a polyamide resin, the non-foam resin is a resin mainly composed of a polyamide-based elastomer resin.

12. A method for producing a male-type molded hook-and-loop fastener-equipped sheet having a non-foam resin sheet (B) on the back surface of a male-type molded hook-and-loop fastener (A), the method comprising:
 superposing and pressure-bonding a sheet (B) composed of a non-foam resin that satisfies the following condition (iii) in a molten state onto the back surface of the male-type molded hook-and-loop fastener (A) that satisfies the following conditions (i) to (iii); and cooling and solidifying the sheet;

wherein the conditions (i) to (iii) are as follows:
(i) the male-type molded hook-and-loop fastener (A) includes a resin-made base plate (a1) and a plurality of male-type engaging elements (a2) rising from the surface of the base plate (a1) and arranged in a row on the base plate (a1);
(ii) the male-type engaging elements (a2) are bent in the same direction as the row direction of the male-type engaging elements from the middle thereof, the tip end portion of the male-type engaging elements (a2) approaches the base plate (a1), and the male-type engaging elements (a2) are made of the same resin as the resin constituting the base plate (a1);
(iii) the resin constituting the non-foam resin sheet (B) is a resin mainly composed of an elastomer resin of the same type as the resin constituting the male-type molded hook-and-loop fastener (A), and the non-foam resin has a lower hardness than the resin constituting the male-type molded hook-and-loop fastener (A).

13. The method for producing a male-type molded hook-and-loop fastener-equipped sheet according to claim 12, wherein the resin constituting the male-type molded hook-and-loop fastener (A) satisfies the following (iv), and the non-foam resin satisfies any one of the following (v) to (vii):
(iv) the resin constituting the male-type molded hook-and-loop fastener (A) is a resin mainly composed of any one of a polypropylene resin, a polyester-based elastomer resin, and a polyamide resin;
(v) when the resin constituting the male-type molded hook-and-loop fastener (A) is a resin mainly composed of a polypropylene resin, the non-foam resin is a resin mainly composed of an olefin-based elastomer resin;
(vi) when the resin constituting the male-type molded hook-and-loop fastener (A) is a resin mainly composed of a polyester-based elastomer resin, the non-foam resin is a resin mainly composed of a polyester-based elastomer resin;
(vii) when the resin constituting the male-type molded hook-and-loop fastener (A) is a resin mainly composed of a polyamide resin, the non-foam resin is a resin mainly composed of a polyamide-based elastomer resin.

* * * * *